(12) United States Patent
Terakawa et al.

(10) Patent No.: US 12,293,780 B2
(45) Date of Patent: May 6, 2025

(54) MAGNETIC RECORDING MEDIUM HAVING A PARTICULAR SPECIFIC SURFACE AREA, MAGNETIC RECORDING AND REPRODUCING APPARATUS, AND MAGNETIC RECORDING MEDIUM CARTRIDGE

(71) Applicant: Sony Group Corporation, Tokyo (JP)

(72) Inventors: Masaru Terakawa, Tokyo (JP); Minoru Yamaga, Tokyo (JP)

(73) Assignee: Sony Group Corporation, Tokyo (JP)

( * ) Notice: Subject to any disclaimer, the term of this patent is extended or adjusted under 35 U.S.C. 154(b) by 433 days.

(21) Appl. No.: 17/760,571

(22) PCT Filed: Oct. 31, 2019

(86) PCT No.: PCT/JP2019/042752
§ 371 (c)(1),
(2) Date: Mar. 15, 2022

(87) PCT Pub. No.: WO2021/059542
PCT Pub. Date: Apr. 1, 2021

(65) Prior Publication Data
US 2022/0399039 A1    Dec. 15, 2022

(30) Foreign Application Priority Data
Sep. 26, 2019   (JP) .................. 2019-176039

(51) Int. Cl.
*G11B 5/78*    (2006.01)
*G11B 5/592*    (2006.01)
(Continued)

(52) U.S. Cl.
CPC ........ *G11B 5/70678* (2013.01); *G11B 5/5928* (2013.01); *G11B 5/714* (2013.01); *G11B 5/72* (2013.01); *G11B 5/78* (2013.01)

(58) Field of Classification Search
CPC ....... G11B 5/00813; G11B 5/78; B32B 7/025; B32B 2307/208; B32B 2307/538
See application file for complete search history.

(56) References Cited

U.S. PATENT DOCUMENTS

2003/0175555 A1 * 9/2003 Usui ............... G11B 5/727
428/832.4
2020/0372932 A1 * 11/2020 Terakawa ............ G11B 5/78
(Continued)

FOREIGN PATENT DOCUMENTS

JP    H06195687 A    7/1994
JP    2003338023 A   11/2003
(Continued)

OTHER PUBLICATIONS

WO-2019189942-A1 with translation (Year: 2019).*

*Primary Examiner* — Hoa (Holly) Le
(74) *Attorney, Agent, or Firm* — K&L Gates LLP

(57) ABSTRACT

Provided is a magnetic recording medium configured to achieve higher density recording. The magnetic recording medium has a tape-like shape, and includes: a base containing polyester as a main constituent; and a magnetic layer provided on the base, including a plurality of magnetic powders, and configured to record a data signal. An average thickness of the magnetic recording medium is 5.6 μm or less. An average thickness of the base is 4.2 μm or less. An average thickness of the magnetic layer is 90 nm or less. An average aspect ratio of the magnetic powders is 1.0 or greater and 3.0 or less. A coercivity in a perpendicular direction is 3000 oersted or less. A rate of a coercivity in a longitudinal direction to the coercivity in the perpendicular direction is 0.8 or less. The magnetic layer includes a lubricant. An entire BET specific surface area of the mag- (Continued)

netic recording medium from which the lubricant has been removed is 2.5 m²/g or greater.

21 Claims, 7 Drawing Sheets

(51) Int. Cl.
*G11B 5/706* (2006.01)
*G11B 5/714* (2006.01)
*G11B 5/72* (2006.01)

(56) References Cited

U.S. PATENT DOCUMENTS

| | | |
|---|---|---|
| 2021/0012799 A1* | 1/2021 | Terakawa ............ G11B 5/00813 |
| 2021/0020197 A1* | 1/2021 | Terakawa ............... G11B 5/658 |
| 2021/0056986 A1* | 2/2021 | Yamaga ............. G11B 5/00817 |
| 2021/0295868 A1* | 9/2021 | Kataguchi .............. G11B 5/735 |

FOREIGN PATENT DOCUMENTS

| | | | | |
|---|---|---|---|---|
| JP | 2007273036 A | 10/2007 | | |
| JP | 2007299513 A | 11/2007 | | |
| JP | 2014199706 A | 10/2014 | | |
| JP | 2017228328 A | 12/2017 | | |
| WO | WO-2015198514 A | 12/2015 | | |
| WO | WO-2019159466 A1 | 8/2019 | | |
| WO | WO-2019187323 A1 * | 10/2019 | ......... G11B 20/1201 |
| WO | WO-2021070417 A1 * | 4/2021 | ............. G11B 5/653 |

* cited by examiner

[ FIG. 1 ]
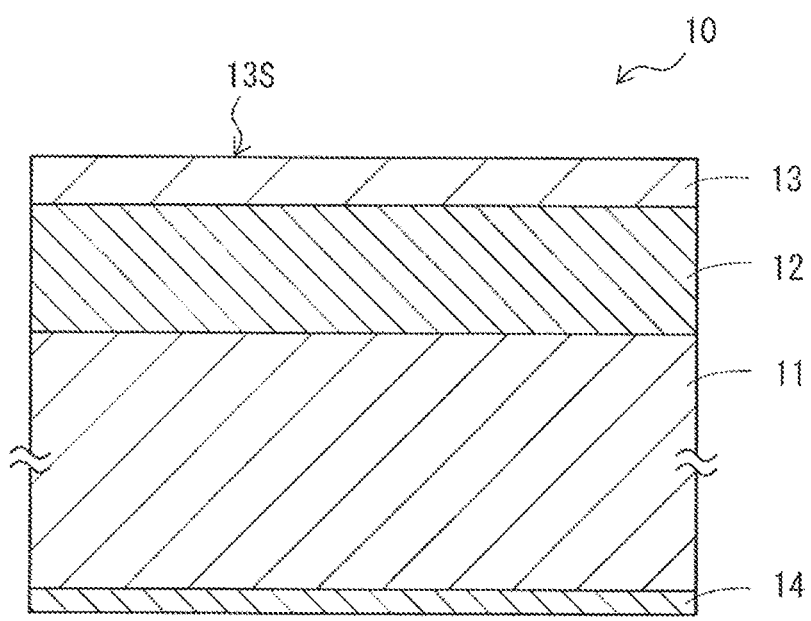

[ FIG. 2 ]
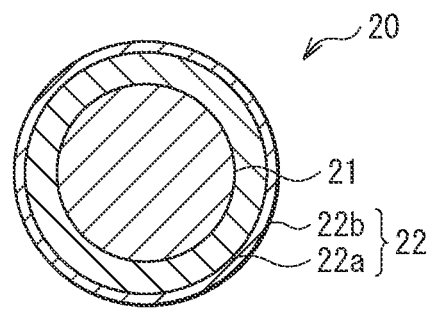
[ FIG. 3 ]
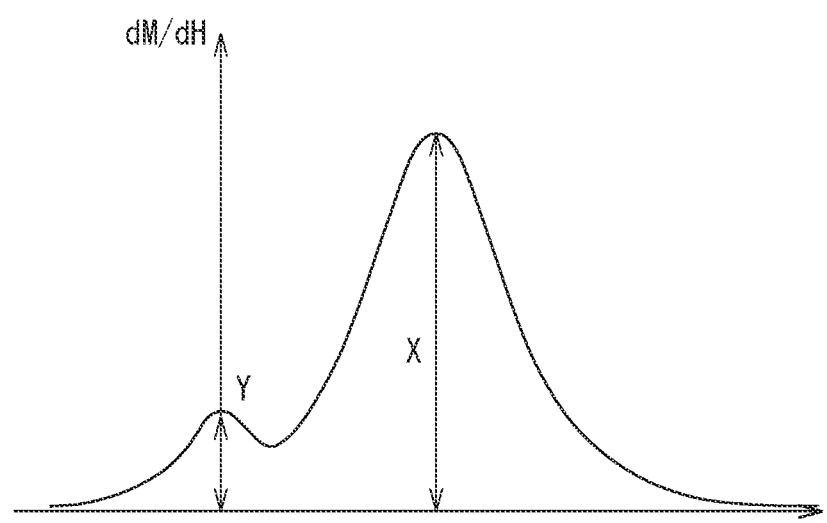

[ FIG. 4 ]
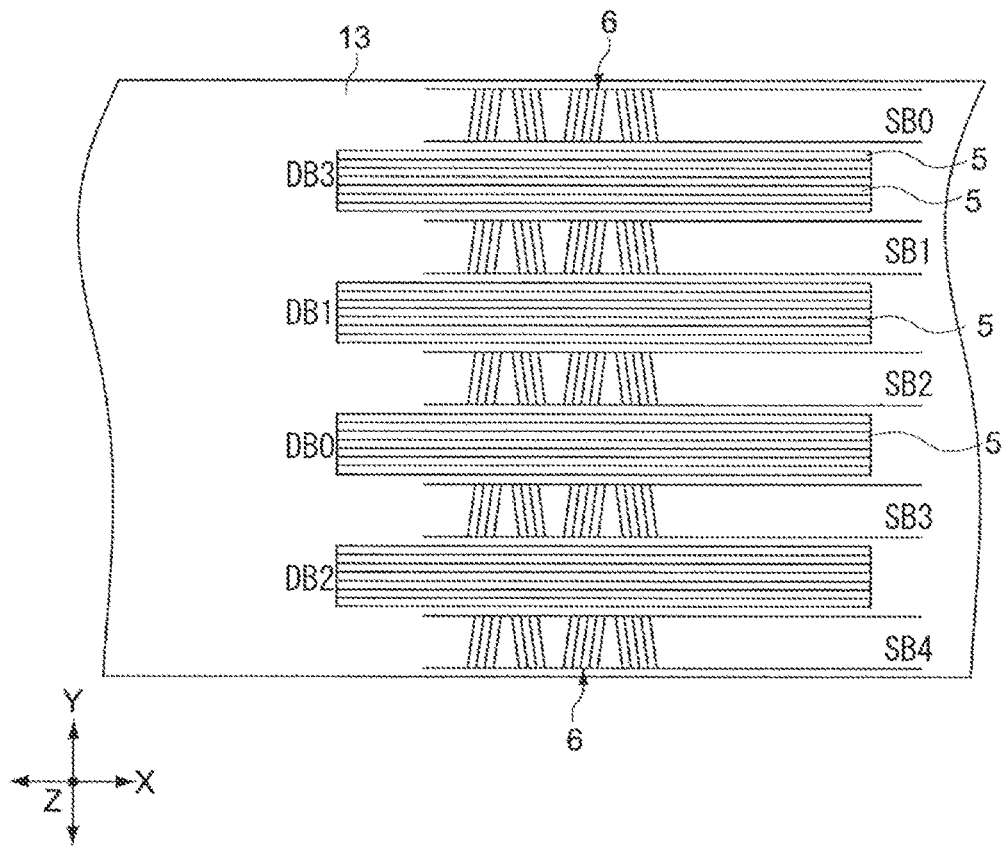
[ FIG. 5 ]
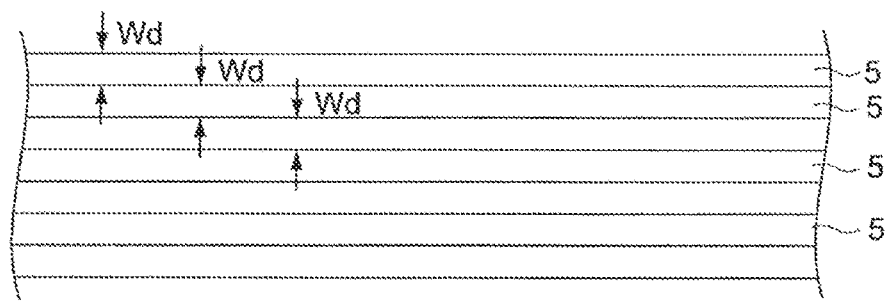

[ FIG. 6 ]
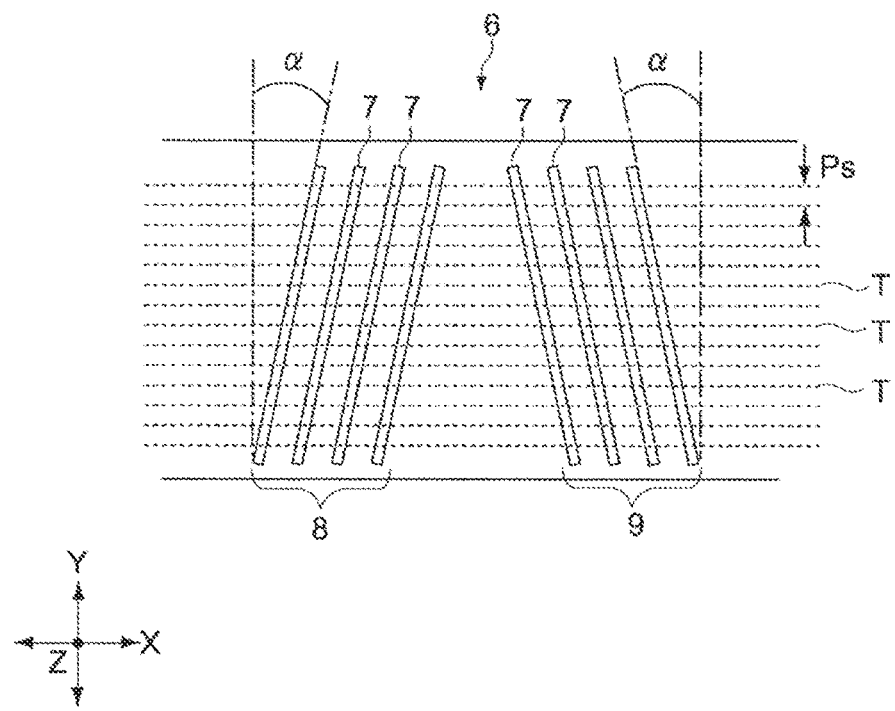

[FIG. 7]
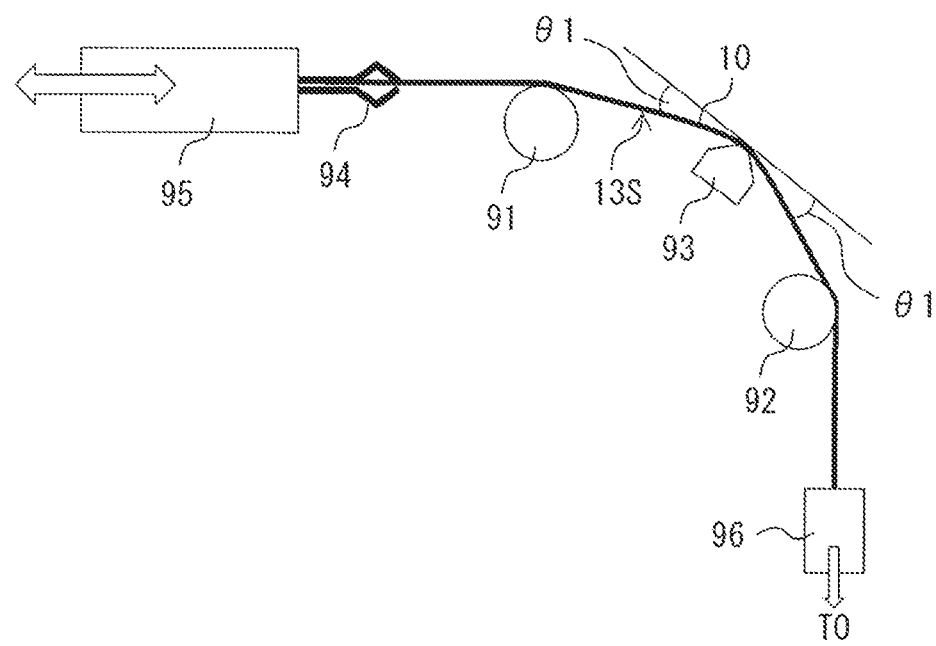

[ FIG. 8 ]
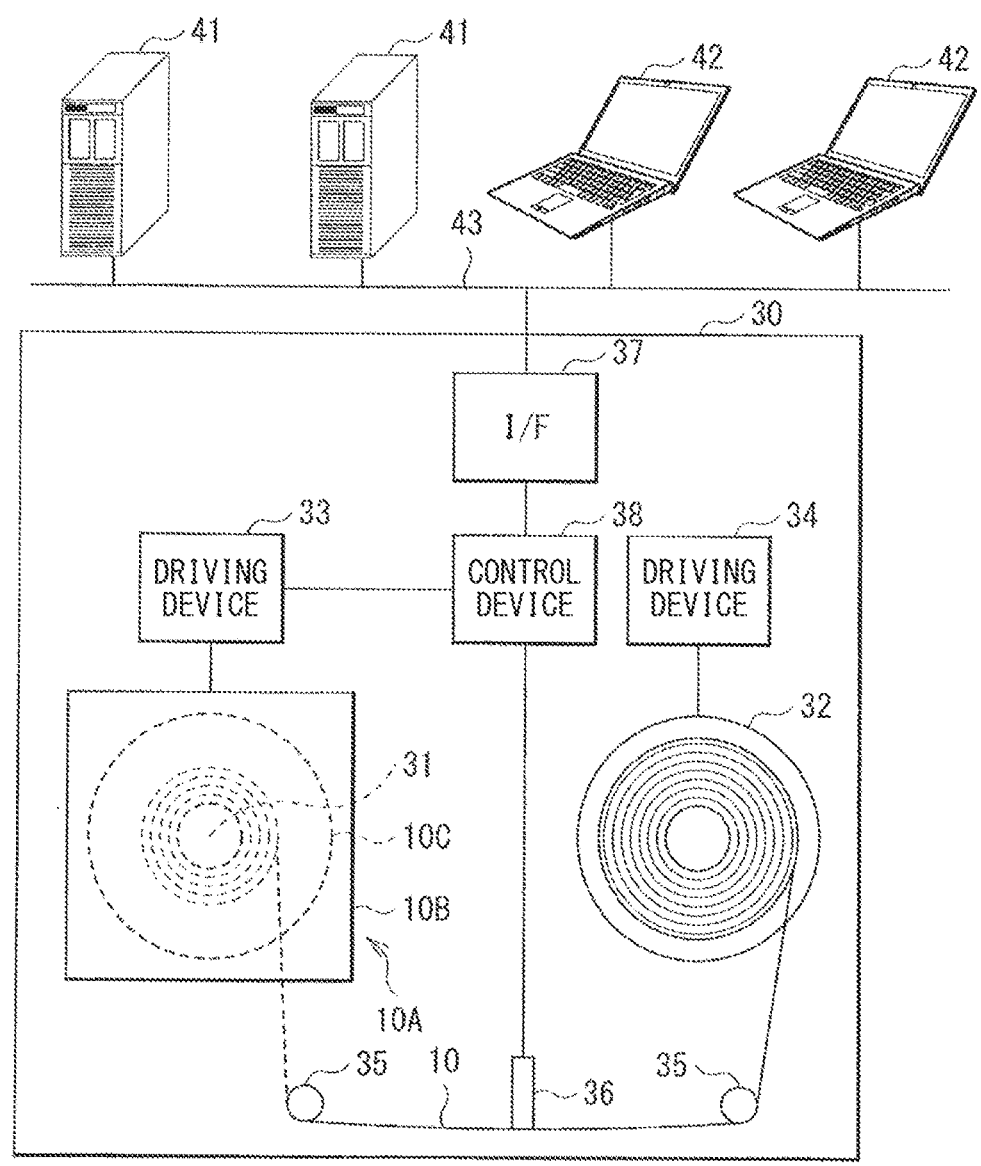

[ FIG. 9 ]
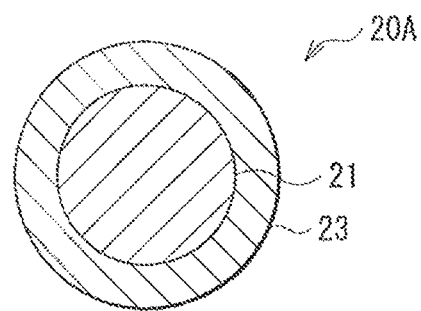
[ FIG. 10 ]
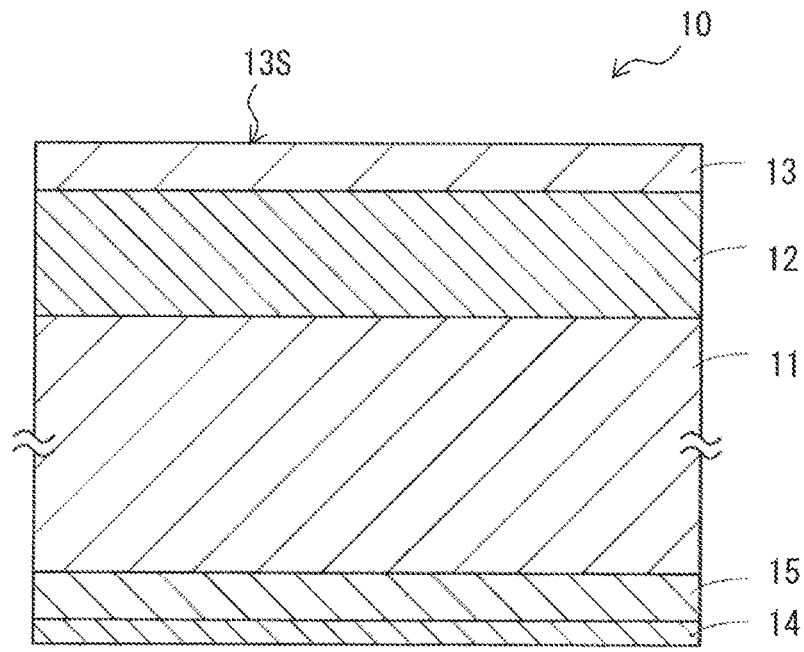

MAGNETIC RECORDING MEDIUM HAVING A PARTICULAR SPECIFIC SURFACE AREA, MAGNETIC RECORDING AND REPRODUCING APPARATUS, AND MAGNETIC RECORDING MEDIUM CARTRIDGE

TECHNICAL FIELD

The present disclosure relates to a magnetic recording medium, a magnetic recording and reproducing apparatus using the magnetic recording medium, and a magnetic recording medium cartridge.

BACKGROUND ART

A tape-like magnetic recording medium including a magnetic layer has been widely used for recording electronic data. The magnetic layer of the magnetic recording medium includes a data band containing a plurality of recording tracks in which data is recorded. Additionally, the magnetic layer includes a servo band which is provided at a position adjacent to the data band in a width direction, and in which servo signals are recorded. A magnetic head reads the servo signals recorded in the servo band to perform positional alignment of the magnetic head relative to the recording tracks.

Longitudinal magnetic recording and perpendicular magnetic recording are known as schemes to record data in the magnetic recording medium. The longitudinal magnetic recording records data by magnetizing the magnetic particles in the magnetic layer in a horizontal direction, and perpendicular magnetic recording records data by magnetizing the magnetic particles in the magnetic layer in a perpendicular direction. In general, the perpendicular magnetic recording enables higher-density data recording than the longitudinal magnetic recording. The inventors of the present application disclose a technology to obtain a reproduced waveform of a servo signal having a favorable symmetry in a case where the servo signal has components magnetized in the perpendicular direction (refer to PTL 1, for example).

CITATION LIST

Patent Literature

[PTL 1] Japanese Unexamined Patent Application Publication No. 2014-199706

SUMMARY OF THE INVENTION

Higher density recording has been required owing to a recent increase in the amount of data to be recorded. A tape-like magnetic recording medium is accommodated in a magnetic recording cartridge, for example. A possible measure to further increase the storage capacity per magnetic recording cartridge is to reduce the entire thickness of the magnetic recording medium to be accommodated in the magnetic recording cartridge and increase the length of the magnetic recording medium (so-called tape length) per magnetic recording cartridge. However, the magnetic recording medium having a thin entire thickness can exhibit inferior traveling stability. In particular, in the case of repetitive recording and/or reproducing, the magnetic recording medium having a thin entire thickness may exhibit a change in its surface condition (in specific, its surface condition relevant to friction), resulting in deterioration of the traveling stability. Accordingly, it is desirable to provide a magnetic recording medium that allows for high-density recording while maintaining its traveling stability.

A magnetic recording medium according to one embodiment of the present disclosure has a tape-like shape and includes: a base containing polyester as a main constituent; and a magnetic layer provided on the base, including a plurality of magnetic powders, and configured to record a data signal. An average thickness of the magnetic recording medium is 5.6 µm or less. An average thickness of the base is 4.2 µm or less. An average thickness of the magnetic layer is 90 nm or less. An average aspect ratio of the magnetic powders is 1.0 or greater and 3.0 or less. A coercivity in a perpendicular direction is 3000 oersted or less. A rate of a coercivity in a longitudinal direction to the coercivity in the perpendicular direction is 0.8 or less. The magnetic layer includes a lubricant. An entire BET specific surface area of the magnetic recording medium from which the lubricant has been removed is 2.5 m2/g or greater.

A magnetic recording and reproducing apparatus according to one embodiment of the present disclosure includes: a feeding section configured to sequentially feed magnetic recording medium having a tape-like shape; a reel section configured to reel in the magnetic recording medium fed from the feeding section; and a magnetic head configured to write data in the magnetic recording medium and retrieve the data from the magnetic recording medium while being in contact with the magnetic recording medium traveling from the feeding section to the reel section.

A magnetic recording medium cartridge includes the magnetic recording medium described above and a housing accommodating the magnetic recording medium.

The magnetic recording medium, the magnetic recording and reproducing apparatus, and the magnetic recording medium cartridge of one embodiment of the present disclosure having the configuration described above maintain favorable traveling stability and are advantageous for high density recording.

BRIEF DESCRIPTION OF THE DRAWINGS

FIG. 1 is a cross-sectional view of a magnetic recording medium according to one embodiment of the present disclosure.

FIG. 2 is a cross-sectional view of an ε-iron oxide particle included in a magnetic layer illustrated in FIG. 1 for schematically illustrating the cross-sectional configuration of the ε-iron oxide particle.

FIG. 3 is a graph illustrating an example of an SFD curve of the magnetic recording medium illustrated in FIG. 1.

FIG. 4 is an outline explanatory diagram illustrating a layout of data bands and servo bands in the magnetic recording medium illustrated in FIG. 1.

FIG. 5 is an outline explanatory diagram illustrating the data band illustrated in FIG. 4 in an enlarged manner.

FIG. 6 is an outline explanatory diagram illustrating a recording pattern of servo signals in the servo band illustrated in FIG. 4 in an enlarged manner.

FIG. 7 is an outline schematic diagram illustrating a method of measuring a dynamic friction coefficient.

FIG. 8 is an outline diagram of a recording and reproducing apparatus using the magnetic recording medium illustrated in FIG. 1.

FIG. 9 is a cross-sectional view of an ε-iron oxide particle according to Modification Example 1 for schematically illustrating a cross-sectional configuration of the ε-iron oxide particle.

FIG. 10 is a cross-sectional view of a magnetic recording medium according to Modification Example 5.

MODES FOR CARRYING OUT THE INVENTION

Hereinafter, embodiments of the present disclosure will be described in detail with reference to the drawings. It is to be noted that the description is given in the following order.
1. Embodiments
   1-1. Configuration of Magnetic Recording Medium
   1-2. Method of Manufacturing Magnetic Recording Medium
   1-3. Configuration of Recording and Reproducing Apparatus
   1-4. Effects
2. Modification Examples

1. EMBODIMENTS 1-1 Configuration of Magnetic Recording Medium 10

FIG. 1 is an example cross-sectional configuration of a magnetic recording medium 10 according to one embodiment of the present disclosure. As illustrated in FIG. 1, the magnetic recording medium 10 includes a laminated structure in which a plurality of layers are stacked. For example, the magnetic recording medium 10 includes an elongated tape-like base 11, an underlayer 12 provided on one main surface 11A of the base 11, a magnetic layer 13 provided on the underlayer 12, and a back layer 14 provided on another main surface 11B of the base 11. The magnetic layer 13 has a surface 13S on which a magnetic head is to travel while being in contact with the surface 13S. It is to be noted that the underlayer 12 and the back layer 14 are provided as needed basis, or may be omitted. It is also to be noted that the magnetic recording medium 10 preferably has an average thickness of 5.6 μm or less, for example.

The magnetic recording medium 10 has an elongated tape-like shape, and is to travel along its longitudinal direction in recording and reproducing operations. The magnetic recording medium 10 is preferably used in a recording and reproducing apparatus provided with a recording head, which may be a ring-type head, for example.

(Base 11)

The base 11 is a non-magnetic supporting member that supports the underlayer 12 and the magnetic layer 13. The base 11 has an elongated film shape. The upper limit value of the average thickness of the base 11 is preferably 4.2 μm or less, more preferably 4.0 μm or less. When the upper limit value of the average thickness of the base 11 is 4.2 μm or less, it is possible to increase the storage capacity per data cartridge, compared with a general magnetic recording medium. The lower limit value of the average thickness of the base 11 is preferably 3 μm or greater, more preferably 3.2 μm or greater. When the lower limit value of the average thickness of the base 11 is 3 μm or greater, it is possible to suppress a decrease in strength of the base 11.

The average thickness of the base 11 is determined as follows. First, the magnetic recording medium 10 having a width of ½ inches is prepared, and cut into a length of 250 mm to produce a sample. Thereafter, the layers of the sample except the base 11, i.e., the underlayer 12, the magnetic layer 13, and the back layer 14 are removed with a solvent, such as MEK (methyl ethyl ketone) or dilute hydrochloric acid. Thereafter, a measuring apparatus, Laser Hologage (LGH-110C) manufactured by Mitutoyo Corporation, is used to measure the thickness of the sample base 11 at five points or more. Thereafter, these measurement values are simply averaged (arithmetically averaged) to calculate an average thickness of the base 11. It is to be noted that the measurement points are randomly selected on the sample.

The base 11 contains polyesters as a primary constituent, for example. The base 11 may include at least one of polyolefins, cellulose derivatives, vinyl-based resins, or other polymeric resins, in addition to polyesters. In a case where the base 11 contains two or more of these materials, the two or more materials may be mixed, copolymerized, or laminated.

The polyesters contained in the base 11 include, for example, at least one of PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p-oxybenzoate), or polyethylene bisphenoxycarboxylate.

The polyolefins contained in the base 11 contain, for example, at least one of PE (polyethylene) or PP (polypropylene). The cellulose derivatives contain, for example, at least one of cellulose diacetate, cellulose triacetate, CAB (cellulose acetate butyrate), or CAP (cellulose acetate propionate). The vinyl-based resins contain, for example, at least one of PVC (polyvinyl chloride) or PVDC (polyvinylidene chloride).

Other polymeric resins contained in the base 11 include, for example, at least one of PA (polyamide, nylon), aromatic PA (aromatic polyamide, aramid), PI (polyimide), PI (aromatic polyimide), PAI (polyamideimide), aromatic PAI (aromatic polyamideimide), PBO (polybenzoxazole, for example, Zylon (Registered Trademark)), polyether, PEK (polyether ketone), polyether-ester, PES (polyether sulfone), PEI (polyetherimide), PSF (polysulfone), PPS (polyphenylene sulfide), PC (polycarbonate), PAR (polyarylate), or PU (polyurethane).

(Magnetic Layer 13)

The magnetic layer 13 is a recording layer to record signals. The magnetic layer 13 contains, for example, magnetic powders, a binder, and a lubricant. The magnetic layer 13 may further include an additive, such as conductive particles, an abrasive, and a rust inhibitor, as needed basis.

The magnetic layer 13 has the surface 13S provided with multiple pores. These multiple pores store lubricant therein. It is preferable that the multiple pores extend perpendicularly to the surface of the magnetic layer 13 to facilitate supply of the lubricant to the surface 13S of the magnetic layer 13. Alternatively, some of the multiple pores may extend perpendicularly.

The surface 13S of the magnetic layer 13 has an arithmetic mean roughness Ra of 2.5 nm or less, preferably 2.2 nm or less, more preferably 1.9 nm or less. When the arithmetic mean roughness Ra is 2.5 nm or less, it is possible to obtain excellent electromagnetic conversion characteristics. The lower limit value of the arithmetic mean roughness Ra of the surface 13S of the magnetic layer 13 may be preferably 1.0 nm or greater, more preferably 1.2 nm or greater, still more preferably 1.4 nm or greater. When the lower limit value of the arithmetic mean roughness Ra of the surface 13S of the magnetic layer 13 is 1.0 nm or greater, it is possible to suppress a decrease in traveling performance due to an increase in friction.

The arithmetic mean roughness Ra of the surface 13S is calculated as follows. First, the surface of the magnetic layer 13 is observed using an AFM (Atomic Force Microscope) to obtain an AFM image of 40 μm×40 μm. Nano Scope IIIa D3100 manufactured by Digital Instruments Co., Ltd., is used as the AFM, and a cantilever made of silicon single crystal is used. The measurement is performed by tuning a tapping frequency within a range from 200 Hz to 400 Hz. The cantilever may be, for example, "SPM-probe NCH normal-type PointProbe L (cantilever length)=125 um" manufactured by NanoWorld AG. Next, the AFM image is divided into 512×512 (=262,144) measurement points. The heights Z(i) (i: measurement point number, i=1 to 262,144) are measured at each of the measurement points, and the heights Z(i) of the measurement points are simply averaged (arithmetically averaged) to obtain an average height (average plane) Zave (=(Z(1)+Z(2)+ . . . +Z(262,144))/262,144). Subsequently, a standard deviation Z"(i)(=|Z(i)−Zave|) of each of the measuring points from the average center line is obtained, and the arithmetic mean roughness Ra [nm](=(Z"(1)+Z"(2)+ . . . +Z"(262,144))/262,144) is calculated. In this case, data processed through image processing, such as a filtering process performed by Flatten order 2 and planefit order 3 XY, is used.

In addition, it is desirable, in the magnetic layer 13, that a PSD (power spectrum density) up to a spatial wavelength of 5 μm be, for example, 2.5 μm or less. By suppressing the PSD to a predetermined value or less, it is possible to reduce a spacing between the recording/reproducing head and the tape-like magnetic recording medium 10 at the time of recording and reproducing, making the magnetic recording medium 10 suitable for high recording density. The PSD is measured as follows. Analysis-mode Power Spectral Density (attached analysis software) is executed on the filtered data described in paragraph 0022 above. Out of the measured data, only the data along the longitudinal direction (X) of the sample are selected and processed as data to be analyzed. The data to be analyzed are stored in the ASC file format, and then processed in the form of an Excel file. Out of data on the amplitudes of frequencies, the data on an amplitude of 5 μm or less are summed to calculate the PDS.

The lower limit value of an entire BET specific surface area of the magnetic recording medium 10 from which the lubricant has been removed is 2.5 m²/g or greater, preferably 3.0 m²/g or greater, more preferably 3.5 m²/g or greater, still more preferably 4.0 m²/g or greater. When the lower limit value of the BET specific surface area is 2.5 m²/g or greater, it is possible to suppress a decrease in the quantity of lubricant supplied to between the surface of the magnetic layer 13 and the magnetic head, even after repetitive recording or reproduction (i.e., even after the magnetic head repeatedly travels while being in contact with the surface of the magnetic recording medium 10). Therefore, it is possible to suppress an increase in the dynamic friction coefficient.

The upper limit value of the entire BET specific surface area of the magnetic recording medium 10 from which the lubricant has been removed is preferably 7 m²/g or less, more preferably 6 m²/g or less, still more preferably 5.5 m²/g or less. When the upper limit value of the BET specific surface area is 7 m²/g or less, it is possible to sufficiently supply the lubricant without causing a shortage of the lubricant even after multiple travels. Therefore, it is possible to suppress an increase in the dynamic friction coefficient.

Herein, the magnetic recording medium 10 from which the lubricant has been removed refers to the magnetic recording medium 10 immersed in hexane at room temperature for 24 hours and naturally dried after being taken out of the hexane.

The BET specific surface area is determined as follows.

First, the magnetic recording medium 10 having a size larger than 0.1265 m² by about 10% in area is immersed in hexane (of which amount is sufficiently enough to soak the magnetic recording medium, e.g., 150 ml of hexane) for 24 hours, then naturally dried. Thereafter, the magnetic recording medium 10 is cut into a size of 0.1265 m² in area (e.g., the magnetic recording medium 1 after being dried is cut at both ends by 50 cm to prepare the magnetic recording medium 10 having a width of 10 m. A measurement sample is thereby produced. Next, the BET specific surface area is determined using a specific surface area and pore distribution measurement apparatus. The measurement apparatus and measurement conditions are described below.

Measurement environment: room temperature
Measurement apparatus: 3FLEX manufactured by Micromeritics
Measurement adsorbate: $N_2$ gas
Measurement pressure range (P/P0): 0 to 0.995

Within the measurement pressure range described above, the pressure is varied as in Table 1 below. The pressure values in Table 1 below are each a relative pressure P/P0. For example, in Step 1 in the following table, the pressure is changed from an initial pressure of 0.000 to a final pressure of 0.010 so as to change by 0.001 per 10 seconds. When the pressure reaches the final pressure, another pressure change is performed in the next step. The same applies to Steps 2 to 10. However, if the pressure has not reached equilibrium in each step, the apparatus waits for the equilibrium of the pressure before transiting to the next step.

TABLE 1

| Step | Initial Pressure | Pressure Change | Final Pressure |
| --- | --- | --- | --- |
| 1 | 0.000 | 0.001/10 sec | 0.010 |
| 2 | 0.010 | 0.02/10 sec | 0.100 |
| 3 | 0.100 | 0.05/10 sec | 0.600 |
| 4 | 0.600 | 0.05/10 sec | 0.950 |
| 5 | 0.950 | 0.05/10 sec | 0.990 |
| 6 | 0.990 | 0.05/10 sec | 0.995 |
| 7 | 0.995 | 0.01/10 sec | 0.990 |
| 8 | 0.990 | 0.01/10 sec | 0.950 |
| 9 | 0.950 | 0.05/10 sec | 0.600 |
| 10 | 0.600 | 0.05/10 sec | 0.300 |

The upper limit value of the average thickness of the magnetic layer 13 is preferably 90 nm or less, particularly preferably 80 nm or less, more preferably 70 nm or less, still more preferably 60 nm or less. In a case where the upper limit value of the average thickness of the magnetic layer 13 is 90 nm or less and where a ring-type head is used as the recording head, it is possible to record magnetizations uniformly in the thickness direction of the magnetic layer 13, and thus to improve the electromagnetic conversion characteristics. Additionally, when the upper limit value of the average thickness of the magnetic layer 13 is 90 nm or less, it is possible to narrow the half width of a solitary waveform in a reproduced waveform of a data signal (to 200 nm or less, for example), and thus to sharpen the peak of the reproduced waveform of the data signal. This improves the accuracy in reading the data signal. It therefore is possible to improve the data recording density by increasing the number of the recording tracks.

The lower limit value of the average thickness of the magnetic layer 13 is preferably 35 nm or greater. In a case where the upper limit value of the average thickness of the magnetic layer 13 is 35 nm or greater and where an MR-type head is used as the reproducing head, it is possible to secure the output, and thus to improve the electromagnetic conversion characteristics.

The average thickness of the magnetic layer 13 is determined as follows. First, carbons film are formed on the surface 13S of the magnetic layer 13 of the magnetic recording medium 10 and a surface 14S of the back layer 14 of the magnetic recording medium 10 by a deposition method. Thereafter, a tungsten thin film is further formed on the carbon film covering the surface 13S of the magnetic layer 13 by a deposition method. These carbon films and tungsten film protect the sample during a thinning process described later.

Next, the magnetic recording medium 10 is processed through, for example, a FIB (focused ion beam) method into a thin piece. In the case where the FIB method is used, the formation of the carbon films and the tungsten thin film serving as the protective film is performed as a pretreatment for observing a cross-sectional TEM image described later. The carbon films are formed on a surface of the magnetic recording medium 10 adjacent to the magnetic layer and a surface of the magnetic recording medium 10 adjacent to the back layer, by a deposition method. The tungsten thin film is then further formed on the surface adjacent to the magnetic layer by a deposition method or a sputtering method. The thinning is performed along the length direction (longitudinal direction) of the magnetic recording medium 10. That is, the thinning forms a cross-section parallel to both the longitudinal direction and the thickness direction of the magnetic recording medium 10. The cross-section of the obtained thin sample piece is observed using a transmission electron microscope (TEM) under the following conditions to obtain a TEM image. It is to be noted that magnification and acceleration voltage may be appropriately adjusted depending on the type of the apparatus.

Apparatus: TEM (H9000NAR manufactured by Hitachi, Ltd.)
Acceleration voltage: 300 kV
Magnification: 100,000 times The obtained TEM image is then used to measure the thickness of the magnetic layer 13 at 10 points or more along the longitudinal direction of the magnetic recording medium 10. The obtained measurement values are simply averaged (arithmetically averaged) to determine the average thickness of the magnetic layer 13. It is to be noted that the measurement points are randomly selected on the sample piece.

(Magnetic Powder)

The magnetic powders contain, for example, nanoparticle powders containing s-iron oxide (hereinafter referred to as "s-iron oxide particle"). Even if the s-iron oxide particles are fine particles, it is possible to obtain a high coercivity. It is preferable that the s-iron oxide contained in the s-iron oxide particle is preferentially crystallographically oriented in the thickness direction of the magnetic recording medium 10.

FIG. 2 is a cross-sectional view of an s-iron oxide particle 20 contained in the magnetic layer 13 for schematically illustrating an example cross-sectional configuration of the ε-iron oxide particle 20. As illustrated in FIG. 2, the s-iron oxide particle 20 has a spherical or substantially spherical shape, or a cubic or substantially cubic shape. Since the ε-iron oxide particle 20 has a shape as described above, when the ε-iron oxide particles 20 are used as magnetic particles, it is possible to reduce the contact area between the particles in the thickness direction of the magnetic recording medium 10, and thus to suppress aggregation of the particles, as compared with the case of using hexagonal plate-shaped barium ferrite particles as the magnetic particles. Therefore, it is possible to obtain enhanced dispersibility of the magnetic powders and a favorable SNR (Signal-to-Noise Ratio).

The ε-iron oxide particle 20 has a core-shell structure, for example. Specifically, as illustrated in FIG. 2, the s-iron oxide particle 20 includes a core portion 21 and a shell portion 22 having a two-layer structure provided around the core portion 21. The two-layer structure of the shell portion 22 includes a first shell portion 22a provided on the core portion 21, and a second shell portion 22b provided on the first shell portion 22a.

The core portion 21 of the ε-iron oxide particle 20 contains ε-iron oxide. The ε-iron oxide contained in the core portion 21 includes preferably ε-$Fe_2O_3$ crystals as a main phase, more preferably a single phase of ε-$Fe_2O_3$.

The first shell portion 22a covers at least a part of the periphery of the core portion 21. Specifically, the first shell portion 22a may partially cover the periphery of the core portion 21 or may cover the entire periphery of the core portion 21. From the viewpoint of ensuring sufficient exchange coupling between the core portion 21 and the first shell portion 22a and improving magnetic characteristics, it is preferable to cover the entire surface of the core portion 21.

The first shell portion 22a is a so-called soft magnetic layer, and contains, for example, a soft magnetic material such as α-Fe, Ni—Fe alloy or Fe—Si—Al alloy. The α-Fe may be obtained by reducing the s-iron oxide contained in the core portion 21.

The second shell portion 22b is an oxide film serving as an antioxidant layer. The second shell portion 22b contains α-iron oxide, aluminum oxide, or silicon oxide. The α-iron oxide includes, for example, at least one iron oxide of $Fe_3O_4$, $Fe_2O_3$, or FeO. When the first shell portion 22a contains α-Fe (soft magnetic material), the α-iron oxide may be obtained by oxidizing the α-Fe contained in the first shell portion 22a.

Since the ε-iron oxide particles 20 has a first shell portion 22a as described above, it is possible to adjust the coercivity Hc of the entire s-iron oxide particle (core shell particle) 20 to a coercivity Hc suitable for recording while maintaining the coercivity Hc of the core portion 21 alone at a large value in order to ensure thermal stability. In addition, since the s-iron oxide particle 20 has the second shell portion 22b as described above, it is possible to suppress deterioration of the characteristics of the ε-iron oxide particle 20 due to rust or the like generating on the particle surface due to exposure of the ε-iron oxide particles 20 to air during or before the manufacturing process of the magnetic recording medium 10. Therefore, it is possible to suppress the characteristic deterioration of the magnetic recording medium 10 by covering the first shell portion 22a with the second shell portion 22b.

The average particle size (average maximum particle size) of the magnetic powders is preferably 25 nm or less, more preferably 8 nm or greater and 22 nm or less, still more preferably 12 nm or greater and 22 nm or less. In the magnetic recording medium 10, a region having a size of half the recording wavelength corresponds to an actual magnetization region. Therefore, it is possible to obtain a favorable S/N by setting the average particle size of the magnetic powders to half or less of the shortest recording wavelength. Therefore, when the average particle size of the magnetic powders is 22 nm or less, it is possible to obtain favorable electromagnetic conversion characteristics (e.g., SNR) of the magnetic recording medium 10 having a high recording density (e.g., the magnetic recording medium 10 configured to be capable of recording signals at the shortest recording wavelength of 50 nm or less). Meanwhile, when the average particle size of the magnetic powders is 8 nm or greater, it is possible to further improve the dispersibility of the magnetic powders, and thus to obtain excellent electromagnetic conversion characteristics (e.g., SNR).

The average aspect ratio of the magnetic powders is preferably 1.0 or greater and 3.0 or less, more preferably 1.0 or greater and 2.8 or less, still more preferably 1.0 or greater and 2.0 or less. When the average aspect ratio of the magnetic powders is within the range from 1 to 3.0 inclusive, it is possible to suppress agglomeration of the magnetic powders and reduce resistance applied to the magnetic powders when the magnetic powders are perpendicularly oriented in the process of forming the magnetic layer 13. Therefore, it is possible to improve the perpendicular orientation of the magnetic powders.

The average particle size and the average aspect ratio of the magnetic powders are determined as follows. First, the magnetic recording medium 10 to be measured is processed through, for example, the FIB (Focused Ion Beam) method into a thin piece. The thinning is performed along the length direction (longitudinal direction) of the magnetic tape. That is, the thinning forms a cross-section parallel to both the longitudinal direction and the thickness direction of the magnetic recording medium 10. The cross-section of the obtained thin sample piece is observed using a transmission electron microscope (H-9500 manufactured by Hitachi High-Technologies) at an acceleration voltage of 200 kV and total magnification of 500,000 times, in such a manner that the magnetic layer 13 is entirely included in the thickness direction of the magnetic layer 13. A TEM photograph is then captured. Next, 50 particles are randomly selected from the captured TEM photograph, and the major axis length DL and the minor axis length DS of each particle are measured. Here, the major axis length DL refers to the maximum distance between any two parallel lines drawn from any angles so as to contact the contour of each particle (so-called maximum Feret diameter). Meanwhile, the minor axis length DS refers to the maximum length of the particle in the direction perpendicular to the major axis length DL of the particle.

Subsequently, the major axis lengths DL of the 50 measured particles are simply averaged (arithmetically averaged) to determine an average major axis length DLave. The average major axis length DLave determined in this manner is defined as the average particle size of the magnetic powders. The minor axis lengths DS of the 50 measured particles are simply averaged (arithmetically averaged) to determine an average minor axis length DSave. Thereafter, an average aspect ratio (DLave/DSave) is determined from the average major axis length DLave and the average minor axis length DSave.

The average particle volume of the magnetic powders is preferably 2300 nm$^3$ or less, more preferably 2200 nm$^3$ or less, more preferably 2100 nm$^3$ or less, more preferably 1950 nm$^3$ or less, more preferably 1600 nm$^3$ or less, still more preferably 1300 nm$^3$ or less. When the average particle volume of the magnetic powders is 2300 nm$^3$ or less, it is possible to narrow the half width of a solitary wave in a reproduced waveform of a data signal (to 200 nm or less), and thus to sharpen the peak of the reproduced waveform of the data signal. This improves the accuracy in reading the data signal. It therefore is possible to improve the data recording density by increasing the number of the recording tracks (details will be described later). It is to be noted that the smaller the average particle volume of the magnetic powders is the better, and the lower limit value of the volume is therefore not limited to a particular value. For example, the lower limit value is 1000 nm$^3$ or greater.

When the ε-iron oxide particle 20 has a spherical or substantially spherical shape, the average particle volume of the magnetic powders is determined as follows. First, the average major axis length DLave is determined in the same manner as the above-described calculation methods of the average particle sizes of the magnetic powders. Next, an average volume V of the magnetic powders is determined using the following expression.

$$V=(\pi/6)\times(DLave)^3$$

(Binder)

It is preferable to use, as the binder, a resin having a structure in which a crosslinking reaction is imparted to a polyurethane-based resin, a vinyl chloride-based resin, or the like. However, the binder is not limited thereto, and other resins may be appropriately blended depending on required physical properties and the like of the magnetic recording medium 10. The resin to be blended is not particularly limited as long as being a resin commonly used in the magnetic recording medium 10 of a coating type.

Examples of the binder include polyvinyl chloride, polyvinyl acetate, vinyl chloride-vinyl acetate copolymer, vinyl chloride-vinylidene chloride copolymer, vinyl chloride-acrylonitrile copolymer, acrylic acid ester-acrylonitrile copolymer, acrylic acid ester-vinyl chloride-vinylidene chloride copolymer, vinyl chloride-acrylonitrile copolymer, acrylic acid ester-acrylonitrile copolymer, acrylic acid ester-vinylidene chloride copolymer, methacrylic acid ester-vinylidene chloride copolymer, methacrylic acid ester-vinyl chloride copolymer, methacrylic acid ester-ethylene copolymer, polyvinyl fluoride, vinylidene chloride-acrylonitrile copolymer, acrylonitrile-butadiene copolymer, polyamide resin, polyvinyl butyral, cellulose derivatives (cellulose acetate butyrate, cellulose diacetate, cellulose triacetate, cellulose propionate, and nitrocellulose), styrene butadiene copolymer, polyester resin, amino resin, and synthetic rubber.

Examples of the thermosetting resin or the reactive resin include phenolic resin, epoxy resin, urea resin, melamine resin, alkyd resin, silicone resin, polyamine resin, urea formaldehyde resin, and the like.

In addition, a polar functional group, such as $-SO_3M$, $-OSO_3M$, $-COOM$, $P=O(OM)_2$ or the like may be introduced into each of the binders described above for the purpose of improving the dispersibility of the magnetic powders. Here, M in the above chemical formulae is a hydrogen atom or an alkali metal, such as lithium, potassium, or sodium.

Further, examples of the polar functional group include those of the side chain type having a terminal group of $-NR1R2$ or $-NR1R2R3^+X^-$, and those of the main chain type of $>NR1R2^+X^-$. Here, R1, R2, and R3 in the above formulae are hydrogen atoms or hydrocarbon groups, and $X^-$ is a halogen element ion, such as fluorine, chlorine, bromine, or iodine, or an inorganic or organic ion. Further, another examples of the polar functional group include $-OH$, $-SH$, $-CN$, and epoxy groups.

(Lubricant)

The lubricant contained in the magnetic layer 13 contains, for example, fatty acid and fatty acid ester. It is preferable that the fatty acid contained in the lubricant contain at least one of a compound represented by the following general formula <1> or a compound represented by the following general formula <2>, for example. Further, it is preferable that the fatty acid ester contained in the lubricant contain at least one of a compound represented by the following general formula <3> or a compound represented by the following general formula <4>. It is possible to suppress an increase in dynamic friction coefficient due to repetitive recording or reproducing on the magnetic recording medium 10 by the lubricant containing two compounds including the compound represented by the general formula <1> and the compound represented by the general formula <3>; the lubricant containing two compounds including the compound represented by the general formula <2> and the compound represented by the general formula <3>; the lubricant containing two compounds including a compound represented by the general formula <1> and the compound represented by the general formula <4>; the lubricant containing two compounds including a compound represented by the general formula <2> and a compound represented by the general formula <4>; the lubricant containing three compounds including the compound represented by the general formula <1>, the compound represented by the general formula <2>, and the compound represented by the general formula <3>; the lubricant containing three compounds including the compound represented by general formula <1>, the compound represented by general formula <2>, and the compound represented by the general formula <4>; the lubricant containing three compounds including the compound represented by the general formula <1>, the compound represented by the general formula <3>, and the compound represented by the general formula <4>; the lubricant containing three compounds including the compound represented by the general formula <2>, the compound represented by the general formula <3>, and the compound represented by the general formula <4>; or the lubricant containing four compounds including the compound represented by the general formula <1>, the compound represented by the general formula <2>, the compound represented by the general formula <3>, and the compound represented by the general formula <4>. As a result, it is possible to improve the traveling performance of the magnetic recording medium 10.

$$CH_3(CH_2)_k COOH \qquad <1>$$

(Note that, in the general formula <1>, k is an integer selected from the range of 14 to 22 inclusive, more preferably the range of 14 to 18 inclusive.)

$$CH_3(CH_2)_n CH=CH(CH_2)_m COOH \qquad <2>$$

(Note that, in the general formula <2>, the sum of n and m is an integer selected from the range of 12 to 20 inclusive, more preferably the range of 14 to 18 inclusive.)

$$CH_3(CH_2)_p COO-(CH_2)_q CH_3 \qquad <3>$$

(Note that, in the general formula <3>, p is an integer selected from the range of 14 to 22 inclusive, more preferably the range of 14 to 18 inclusive, and q is an integer selected from the range of 2 to 5 inclusive, more preferably the range of 2 to 4 inclusive.)

$$CH_3(CH_2)_p COO-(CH_2)_q CH(CH_3)_2 \qquad <4>$$

(Note that, in the general formula <2>, p is an integer selected from the range of 14 to 22 inclusive, q is an integer selected from the range of 1 to 3 inclusive.)

(Additive)

The magnetic layer 13 may further contain aluminum oxide (α, β, or γ alumina), chromium oxide, silicon oxide, diamond, garnet, emery, boron nitride, titanium carbide, silicon carbide, titanium carbide, titanium oxide (rutile or anatase-type titanium oxide), or the like as non-magnetic reinforcing particles.

(Underlayer 12)

The underlayer 12 is a non-magnetic magnetic layer containing non-magnetic powders and a binder. The underlayer 12 may further include at least one additive of, for example, a lubricant, conductive particles, a curing agent, or a rust inhibitor, as needed basis. Further, the underlayer 12 may have a multilayer structure in which a plurality of layers are stacked. An average thickness of the underlayer 12 is preferably 0.4 μm or greater and 1.4 μm or less, more preferably 0.6 μm or greater and 1.2 μm or less.

The average thickness of the underlayer 12 is determined, for example, as follows. First, the magnetic recording medium 10 having a width of ½ inches is prepared, and cut into a length of 250 mm to produce a sample. Thereafter, the underlayer 12 and the magnetic layer 13 are then removed from the base 11 of the sample of the magnetic recording medium 10. Thereafter, the measuring apparatus, Laser Hologage (LGH-110C) manufactured by Mitsutoyo Corporation, is used to measure the thickness of the laminate of the underlayer 12 and the magnetic layer 13 removed from the base 11 at five points or more. Thereafter, these measurement values are simply averaged (arithmetically averaged) to calculate an average thickness of the laminate of the underlayer 12 and the magnetic layer 13. It is to be noted that the measurement points are randomly selected on the sample. Finally, an average thickness of the underlayer 12 is determined by subtracting the average thickness of the magnetic layer 13 measured using the TEM as described above from the average thickness of the laminate.

The underlayer 12 preferably has multiple pores. Since the lubricant is stored in these multiple pores, it is possible to further suppress a decrease in the quantity of the lubricant supplied to between the surface 13S of the magnetic layer 13 and the magnetic head even after repetitive recording or reproducing, that is, even after the magnetic head travels repeatedly while being in contact with the surface of the magnetic recording medium 10. Therefore, it is possible to further suppress an increase in the dynamic friction coefficient.

From the viewpoint of suppressing a decrease in the dynamic frictional coefficient after repetitive recording or reproduction, it is preferable that the pores of the underlayer 12 be connected to the pores 13A of the magnetic layer 13. Here, the state in which the pores of the underlayer 12 are connected to the pores 13A of the magnetic layer 13 includes a state in which some of the multiple pores of the underlayer 12 are connected to some of the pores of the magnetic layer 13.

From the viewpoint of facilitating the supply of the lubricant to the surface 13S of the magnetic layer 13, it is preferable that the multiple pores include those extending perpendicularly to the surface 13S of the magnetic layer 13. In addition, from the viewpoint of facilitating the supplying property of the lubricant to the surface 13S of the magnetic layer 13, it is preferable that the pores of the underlayer 12 extending perpendicularly to the surface 13S of the magnetic layer 13 are connected to the pores of the magnetic layer 13 extending perpendicularly to the surface 13S of the magnetic layer 13.

(Non-Magnetic Powder of Underlayer 12)

The non-magnetic powders include, for example, at least one of inorganic particle powders or organic particle powders. Further, the non-magnetic powders may include carbon powders, such as carbon black. One kind of non-magnetic powders may be used alone, or two or more kinds of non-magnetic powders may be used in combination. Examples of the inorganic particles include metals, metal oxides, metal carbonates, metal sulfates, metal nitrides, metal carbides or metal sulfides, or the like. The non-magnetic powders have various shapes including, but not limited thereto, needle-like, spherical, cubic, or plate-like shapes.

(Binder for Underlayer 12)

The binder for the underlayer 12 is similar to that in the magnetic layer 13 described above.

(Back Layer 14)

The back layer 14 includes, for example, a binder and non-magnetic powders. The back layer 14 may further include at least one additive of a lubricant, a curing agent, an antistatic agent, or the like, as needed basis. The binder and the non-magnetic powders in the back layer 14 are the same as the binder and the non-magnetic powders in the underlayer 12 described above.

The average particle size of the non-magnetic powders in the back layer 14 is preferably 10 nm or greater and 150 nm or less, more preferably 15 nm or greater and 110 nm or less. The average particle size of the non-magnetic powders in the back layer 14 is determined in the same manner as for the average particle size of the magnetic powders in the magnetic layer 13 described above. The non-magnetic powders may include one having a particle size distribution of 2 or greater.

The upper limit value of the average thickness of the back layer 14 is preferably 0.6 µm or less, particularly preferably 0.5 µm or less. When the upper limit value of the average thickness of the back layer 14 is 0.6 µm or less, it is possible to keep the thicknesses of the underlayer 12 and the base 11 thick even if the average thickness of the magnetic recording medium 10 is 5.6 µm or less, and thus to maintain traveling stability of the magnetic recording medium 10 in the recording and reproducing apparatus. The lower limit value of the average thickness of the back layer 14 is, for example but not particularly limited to, 0.2 µm or greater, particularly preferably 0.3 µm or greater.

The average thickness of the back layer 14 is determined as follows. First, the magnetic recording medium 10 having a width of ½ inches is prepared, and cut into a length of 250 mm to produce a sample. Thereafter, the measuring apparatus, Laser Hologage (LGH-110C) manufactured by Mitsutoyo Corporation, is used to measure the thickness of the sample of the magnetic recording medium 10 at five points or more. Thereafter, these measurement values are simply averaged (arithmetically averaged) to calculate an average thickness $t_T$ [µm] of the magnetic recording medium 10. It is to be noted that the measurement points are randomly selected on the sample. Subsequently, the back layer 14 is removed from the sample of the magnetic recording medium 10 with a solvent, such as MEK (methyl ethyl ketone) or dilute hydrochloric acid. Thereafter, the Laser Hologage is used again to measure the thickness of the sample of the magnetic recording medium 10 from which the back layer 14 has been removed, at five points or more. These measurement values are simply averaged (arithmetically averaged) to calculate an average thickness $t_B$ [µm] of the magnetic recording medium 10 from which the back layer 14 has been removed. It is to be noted that the measurement positions are randomly selected on the sample. Finally, an average thickness $t_b$ [µm] of the back layer 14 is determined by the following expression.

$$t_b\ [\mu m]=t_T\ [\mu m]-t_B\ [\mu m]$$

The back layer 14 has a surface on which multiple projections are provided. The projections are used to form multiple pores on a surface of the magnetic layer 13 when the magnetic recording medium 10 is a rolled state. The multiple pores are configured by, for example, multiple non-magnetic particles protruding from the surface of the back layer 14.

Here, the case has been described where the multiple protrusions provided on the surface of the back layer 14 are transferred onto the surface of the magnetic layer 13 to form the multiple pores on the surface of the magnetic layer 13; however, the method of forming multiple pores is not limited thereto. For example, the type of solvent contained in a coating material for forming a magnetic layer, drying conditions of the coating material for forming a magnetic layer, and the like may be adjusted to form multiple pores on the surface of the magnetic layer 13.

[Average Thickness of Magnetic Recording Medium]

The upper limit value of the average thickness (average total thickness) of the magnetic recording medium 10 is preferably 5.6 µm or less, more preferably 5.0 µm or less, particularly preferably 4.6 µm or less, still more preferably 4.4 µm or less. When the average thickness of the magnetic recording medium 10 is 5.6 µm or less, it is possible to increase the storage capacity per data cartridge, compared with a general magnetic recording medium. The lower limit value of the average thickness of the magnetic recording medium 10 is, for example but not particularly limited to, 3.5 µm or greater.

The average thickness tT of the magnetic recording medium 10 is determined as follows. First, the magnetic recording medium 10 having a width of ½ inches is prepared, and cut into a length of 250 mm to produce a sample. Thereafter, the measuring apparatus, Laser Hologage (LGH-110C) manufactured by Mitsutoyo Corporation, is used to measure the thickness of the sample at five points or more. Thereafter, these measurement values are simply averaged (arithmetically averaged) to calculate an average thickness tT [µm]. It is to be noted that the measurement points are randomly selected on the sample.

(Coercivity Hc1 in Perpendicular Direction)

The upper limit value of the coercivity Hc1 in the perpendicular directions is 3000 Oe or less, more preferably 2900 Oe or less, still more preferably 2850 Oe or less. The greater coercivity Hc1 is more preferred because of being less susceptible to influences of thermal disturbances and demagnetizing fields. However, the coercivity Hc1 greater than 3000 Oe may hinder saturation recording by the recording head, leaving unrecorded portions and increasing noises. This may result in deterioration of the electromagnetic conversion characteristics (e.g., C/N).

The lower limit value of the coercivity Hc1 in the perpendicular directions is preferably 2200 Oe or greater, more preferably 2400 Oe or greater, still more preferably 2600 Oe or greater. When the coercivity Hc1 is 2200 Oe or greater, it is possible to suppress the deterioration of the electromagnetic conversion characteristics (e.g., C/N) in a high-temperature environment due to influences of thermal disturbances and demagnetizing fields.

The above-mentioned coercivity Hc1 is determined as follows. Three sheets of the magnetic recording media 10 are laminated by bonding with double-sided tapes, and then punched out by a 6.39 mm-diameter punch to prepare measurement samples. At this time, marking is performed with any ink having no magnetism so that the longitudinal direction of the magnetic recording medium is made recognizable. Thereafter, a vibrating sample magnetometer (VSM) is used to measure M-H loop of the measuring samples (the entire magnetic recording medium 10) corresponding to the longitudinal direction of the magnetic recording medium 10 (the traveling direction of the magnetic recording medium 10). Next, acetone, ethanol, or the like is used to wipe off the coating film (the underlayer 12, the magnetic layer 13, and the back layer 14, etc.) to leave only the base 11. Then, three sheets of the obtained bases 11 are laminated by bonding with double-sided tapes, and then punched out by a 6.39 mm-diameter punch to produce background-correction samples (hereinafter, simply referred to as correction samples). Thereafter, the VSM is used to measure the M-H loop of the correction samples (the base 11) corresponding to the perpendicular direction of the base 11 (the thickness direction of the magnetic recording medium 10).

For example, the high sensitivity vibrating sample magnetometer "VSM-P7-15" manufactured by Toei Industry Co., Ltd. is used to measure the M-H loop of the measurement samples (the entire magnetic recording medium 10) and the M-H loop of the correction samples (the base 11). Measurement conditions are as follows: measurement mode: full loop, maximum magnetic field: 15 kOe, magnetic field step: 40 bits, time constant of locking amp: 0.3 sec, waiting time: 1 sec. and MH averaging number: 20.

After the two M-H loops are obtained, the M-H loop of the correction samples (the base 11) is subtracted from the M-H loop of the measurement samples (the entire magnetic recording medium 10) to perform background correction, and an M-H loop after the background correction is thereby obtained. Measurement and analysis programs attached to the "VSMP7-15" are used for calculation in the background correction.

The coercivity Hc1 is determined from the obtained M-H loop after the background correction. The measurement and analysis programs attached to the "VSM-P7-15" are used to calculate the coercivity Hc1. It is to be noted that the measurements of the M-H loops described above are performed at 25° C. In addition, "demagnetizing field correction" is not performed when the M-H loop is measured in the perpendicular direction of the magnetic recording medium 10.

(Coercivity Hc2 in Longitudinal Direction)

The upper limit value of the coercivity Hc2 in the longitudinal direction of the magnetic recording medium 10 is preferably 2000 Oe or less, more preferably 1900 Oe or less, still more preferably 1800 Oe or less. When the coercivity Hc2 in the longitudinal direction is 2000 Oe or less, a high-sensitivity magnetization reaction is caused by a magnetic field in the perpendicular direction from the recording head, allowing for the formation of a favorable recording pattern.

The lower limit value of the coercivity Hc2 measured in the longitudinal direction of the magnetic recording medium 10 is preferably 1000 Oe or greater. When the lower limit value of the coercivity Hc in the longitudinal direction is 1000 Oe or greater, it is possible to suppress demagnetization due to a leakage flux from the recording head.

The above-mentioned coercivity Hc2 is determined in the same manner as for the coercivity Hc1 in the perpendicular direction, except that the M-H loops of the whole measurement samples and the background-correction samples are measured in the direction corresponding to the longitudinal direction (traveling direction) of the magnetic recording medium 10.

(Hc2/Hc1)

The rate Hc2/Hc1 of the coercivity Hc2 in the longitudinal direction to the coercivity Hc1 in the perpendicular direction satisfies the relationship, Hc2/Hc1≤0.8, preferably Hc2/Hc1≤0.75, more preferably Hc2/Hc1≤0.7, still more preferably Hc2/Hc1≤0.65, particularly preferably Hc2/Hc1≤0.6. When the coercivities Hc1 and Hc2 satisfy the relationship of Hc2/Hc1≤0.8, it is possible to increase the degree of perpendicular orientation of the magnetic powders. Therefore, it is possible to reduce the magnetization transition width, and thus to obtain a high output signal at the time of signal reproduction. This allows for an improvement in the electromagnetic conversion characteristics (e.g., C/N). It is to be noted that, as described above, when Hc2 is small, high-sensitivity magnetization reaction is caused by the magnetic field in the perpendicular direction from the recording head, allowing for the formation of a favorable recording pattern.

When the rate Hc2/Hc1 satisfies Hc2/Hc1≤0.8, it is particularly effective that the average thickness of the magnetic layer 13 is 90 nm or less. If the average thickness of the magnetic layer 13 is greater than 90 nm and a ring-type head is used as the recording head, a lower region of the magnetic layer 13 (a region adjacent to the underlayer 12) is magnetized in the longitudinal direction. This may hinder the magnetic layer 13 from being magnetized uniformly in the thickness direction. Therefore, even if the rate Hc2/Hc1 satisfies Hc2/Hc1≤0.8 (i.e., even if the degree of perpendicular orientation of the magnetic powders is increased), the electromagnetic conversion characteristics (e.g., C/N) may be hindered from improving.

The lower limit value of Hc2/Hc1 is, for example but not particularly limited to, 0.5≤Hc2/Hc1.

It is to be noted that Hc2/Hc1 represents the degree of perpendicular orientation of the magnetic powders, and the degree of perpendicular orientation of the magnetic powders becomes greater as Hc2/Hc1 becomes smaller. The reason why Hc2/Hc1 is used as an index indicating the degree of perpendicular orientation of the magnetic powders in the present embodiment will be described below.

A squareness ratio SQ (=(Mr/Ms)×100, where Mr (emu) represents residual magnetization, and Ms (emu) represents saturation magnetization) has been generally used as an index (parameter) indicating the degree of perpendicular orientation of the magnetic powders. However, according to the findings of the present inventors, the index, the squareness ratio SQ, is not appropriate as an index indicating the degree of perpendicular orientation of the magnetic powders for the following reasons.

(1) The squareness ratio SQ varies depending on the value of the coercivity Hc of the magnetic powders. For example, as illustrated in FIG. 5, when the coercivity Hc of the magnetic powders increases, the squareness ratio SQ also apparently becomes greater.

(2) The squareness ratio SQ is affected by distortion of the M-H loop due to overdispersion.

Therefore, in the present embodiment, Hc2/Hc1 is used as an index more appropriately indicating the degree of orientation of the magnetic powders. Since the coercivities Hc1 and Hc2 are simply varied by the orientation direction of the magnetic powders, Hc2/Hc1 is more appropriate as an index indicating the degree of orientation of the magnetic powders.

(Squareness Ratio)

A squareness ratio S1 in the perpendicular direction (thickness direction) of the magnetic recording medium 10 is, for example, 65% or greater, preferably 70% or greater, more preferably 75% or greater, still more preferably 80% or greater, particularly preferably 85% or greater. When the squareness ratio S1 is 65% or greater, the perpendicular orientation of the magnetic powders becomes sufficiently high. Therefore, it is possible to obtain a more excellent SNR.

The squareness ratio S1 is determined as follows. Three sheets of the magnetic recording media 10 are laminated by bonding with double-sided tapes, and then punched out by a 6.39 mm-diameter punch to prepare measurement samples. At this time, marking is performed with any ink having no magnetism so that the longitudinal direction (traveling direction) of the magnetic recording medium is made recognizable. Thereafter, the vibrating sample magnetometer (VSM) is used to measure M-H loop of the measurement samples (the entire magnetic recording medium 10) corresponding to the longitudinal direction of the magnetic recording medium 10 (the traveling direction of the magnetic recording medium 10). Next, acetone, ethanol, or the like is used to wipe off the coating film (the underlayer 12, the magnetic layer 13, and the back layer 14, etc.) to leave only the base 11. Then, three sheets of the obtained bases 11 are laminated by bonding with double-sided tapes, and then punched out with a 6.39 mm-diameter punch to produce background correction samples (hereinafter simply referred to as correction samples). Thereafter, the M-H loop of the correction samples (the base 11) corresponding to the longitudinal direction of the base 11 (the traveling direction of the magnetic recording medium 10) is measured using the VSM.

For example, the high sensitivity vibrating sample magnetometer "VSM-P7-15" manufactured by Toei Industry Co., Ltd. is used to measure the M-H loop of the measurement samples (the entire magnetic recording medium 10) and the M-H loop of the correction samples (the base 11). Measurement conditions are as follows: measurement mode: full loop, maximum magnetic field: 15 kOe, magnetic field step: 40 bits, time constant of locking amp: 0.3 sec, waiting time: 1 sec, and MH averaging number: 20.

After the two M-H loops are obtained, the M-H loop of the correction samples (base 11) is subtracted from the M-H loop of the measurement samples (the entire magnetic recording medium 10) to perform background correction, and an M-H loop after the background correction is thereby obtained. Measurement and analysis programs attached to the "VSMP7-15" are used for calculation in the background correction.

The obtained saturation magnetization Ms (emu) and the obtained residual magnetization Mr (emu) of the M-H loop after background correction are substituted in the following expression to calculate the squareness ratio S1(%).

Squareness Ratio $S1(\%)=(Mr/Ms)\times 100$

It is to be noted that the measurement of the M-H loops described above are performed at 25° C. In addition, "demagnetizing field correction" is not performed when the M-H loop is measured in the perpendicular direction of the magnetic recording medium 10.

A squareness ratio S2 in the longitudinal direction (traveling direction) of the magnetic recording medium 10 is preferably 35% or less, more preferably 30% or less, still more preferably 25% or less, particularly preferably 20% or less, and most preferably 15% or less. When the squareness ratio S2 is 35% or less, the perpendicular orientation of the magnetic powders becomes sufficiently high. Therefore, it is possible to obtain a more excellent SNR.

The squareness ratio S2 is determined in the same manner as for the squareness ratio S1 except that the M-H loops are measured in the longitudinal direction (the traveling direction) of the magnetic recording medium 10 and the base 11.

(SFD)

In an SFD (Switching Field Distribution) curve of the magnetic recording medium 10, the peak ratio X/Y between a main peak height X and a sub-peak height Y near zero magnetic field is preferably 3.0 or greater, more preferably 5.0 or greater, still more preferably 7.0 or greater, particularly preferably 10.0 or greater, most preferably 20.0 or greater (see FIG. 3). When the peak ratio X/Y is 3.0 or greater, it is possible to suppress a large amount of low coercivity components peculiar to ε-iron oxide, such as soft magnetic particles and superparamagnetic particles, other than the ε-iron oxide particles 20 contributing to actual recording, from being contained in the magnetic powders. Therefore, it is possible to suppress the deterioration of magnetization signals recorded in adjacent tracks due to leakage of a magnetic field from the recording head, and thus to obtain a more excellent SNR. The upper limit value of the peak ratio X/Y is, for example but not particularly limited to, 100 or less.

The peak ratio X/Y is determined as follows. First, the M-H loop after the background correction is obtained in the same manner as in the method of measuring the coercivity Hc described above. Next, an SFD curve is calculated from the obtained M-H loop. For the calculation of the SFD curve, a program attached to the measurement apparatus may be used, or other programs may be used. The peak ratio X/Y is calculated, where "Y" is the absolute value of the point at which the calculated SFD curve crosses a Y-axis (dM/dH), and "X" is the height of the main peak observed in the vicinity of the coercivity Hc in the M-H loop. It is to be noted that the measurement of the M-H loop is performed at 25° C. in the same manner as in the method of measuring the coercivity Hc described above. In addition, "demagnetizing field correction" is not performed when the M-H loop is measured in the thickness direction (perpendicular direction) of the magnetic recording medium 10. Further, a plurality of samples to be measured may be laminated for the measurement of the M-H loop depending on the sensitivity of the VSM to be used.

(Activation Volume Vact)

The activation volume Vact is preferably 8000 nm³ or less, more preferably 6000 nm³ or less, still more preferably 5000 nm³ or less, particularly preferably 4000 nm³ or less, and most preferably 3000 nm³ or less. When the activation volume Vact is 8000 nm³ or less, the dispersion state of the magnetic powders becomes favorable. Therefore, it is possible to make a bit inversion region steep and thus to suppress the deterioration of the magnetization signals recorded in adjacent tracks due to leakage of a magnetic field from the recording head. Accordingly, it is possible to obtain a more excellent SNR.

The activation volume Vact described above is determined by the following expression derived by Street & Woolley.

$Vact\ (nm^3)=kB\times T\times Xirr/(\mu 0\times Ms\times S)$ (where kB represents Boltzmann's constant ($1.38\times 10^{-23}$ J/K), T represents temperature (K), Xirr represents irreversible magnetic susceptibility, μ0 represents magnetic permeability in vacuum, S represents magnetic viscosity coefficient, Ms represents saturation magnetization (emu/cm³)).

The irreversible magnetic susceptibility Xirr, the saturation magnetization Ms, and the magnetic viscosity coefficient S to be substituted in the above expression are determined by using the VSM as follows. Three sheets of the magnetic recording media 10 are laminated by bonding with double-sided tapes, and then punched out by a 6.39 mm-diameter punch to prepare measurement samples. At this time, marking is performed with any ink having no magnetism so that the longitudinal direction (traveling direction) of the magnetic recording medium 10 is made recognizable. It is to be noted that the measurement by the VSM is performed in the thickness direction (perpendicular direction) of the magnetic recording medium 10. Additionally, the measurement on the measurement samples cut out from the elongated magnetic recording medium 10 is performed using the VSM, at 25° C. In addition, "demagnetizing field correction" is not performed when the M-H loop is measured in the thickness direction (perpendicular direction) of the magnetic recording medium 10. Further, the high sensitivity vibrating sample magnetometer "VSM-P7-15" manufactured by Toei Industry Co., Ltd. is used to measure the M-H loop of the measurement samples (the entire of the magnetic recording medium 10) and the M-H loop of the correction samples (the base 11). Measurement conditions are as follows: measurement mode: full loop, maximum magnetic field: 15 kOe, magnetic field step: 40 bits, time constant of locking amp: 0.3 sec, waiting time: 1 sec, and MH averaging number: 20.

(Irreversible Magnetic Susceptibility Xirr)

The irreversible magnetic susceptibility Xirr is defined as a slope in the vicinity of a residual coercivity Hr of the slope of the residual magnetization curve (DCD curve). First, a magnetic field of −1193 kA/m (15 kOe) is applied to the entire magnetic recording medium 10, and the magnetic field is returned to zero to be a residual magnetization state. Thereafter, a magnetic field of about 15.9 kA/m (200 Oe) is applied in the opposite direction, and the magnetic field is returned to zero again to measure the residual magnetic amount. Thereafter, similarly, the measurement in which a magnetic field greater than the previously applied magnetic field by 15.9 kA/m is applied and returned to zero is repeatedly performed, and the residual magnetization amount is plotted with respect to the applied magnetic field to measure a DCD curve. From the obtained DCD curve, the point where the magnetization amount becomes zero is determined as the residual coercivity Hr. Further, the DCD curve is differentiated to determine the slope of the DCD curve in each magnetic field. Out of the slope of the DCD curve, the slope in the vicinity of the residual coercivity Hr is Xirr.

(Saturation Magnetization Ms)

First, the M-H loop after the background correction is obtained in the same manner as in the method of measuring the coercivity Hc described above. Next, Ms (emu/cm$^3$) is calculated from the value of saturation magnetization Ms (emu) of the obtained M-H loop and the volume (cm$^3$) of the magnetic layer 13 in each measurement sample. It is to be noted that the volume of the magnetic layer 13 is determined by multiplying the area of the measurement sample by the average thickness of the magnetic layer 13. The method of calculating the average thickness of the magnetic layer 13 necessary for calculating the volume of the magnetic layer 13 is as described above.

(Magnetic Viscosity Coefficient S)

First, a magnetic field of −1193 kA/m (15 kOe) is applied to the entire magnetic recording medium 10 (measurement samples), and the magnetic field is returned to zero to be a residual magnetization state. Thereafter, a magnetic field equivalent to the value of the residual coercivity Hr obtained from the DCD curve is applied in the opposite direction. The amount of magnetization is continuously measured at regular time intervals for 1000 seconds during the application of the magnetic field. The relationship between the time t and the magnetization amount M(t) obtained in such a manner is used in the following expression to calculate the magnetic viscosity coefficient S.

$$M(t) = M0 + S \times \ln(t)$$

(where M(t) represents the magnetization amount of the time t, M0 represents an initial magnetization amount, S represents the magnetic viscosity coefficient, and ln(t) represents the natural logarithm of the time).

(Data Bands and Servo Bands)

FIG. 4 is a schematic view of the magnetic recording medium 10 as viewed from above. As illustrated in FIG. 4, the magnetic layer 13 includes a plurality of data bands DB (in FIG. 4, data bands DB0 to DB3 are illustrated) extending in the longitudinal direction (X-axis direction) of the magnetic recording medium 10, and a plurality of servo bands SB (in FIG. 4, servo bands SB0 to SB4 are illustrated) extending in the longitudinal direction (X-axis direction) of the magnetic recording medium 10. A data signal is written in each of the plurality of data bands DB, and a servo signal for tracking control of the magnetic head is written in each of the plurality of servo bands SB. Further, each data band DB is arranged so as to be sandwiched by the plurality of servo bands SB adjacent to each other in the width direction (Y-axis direction).

The upper limit value of a ratio $R_S$ (=$S_{SB}$/S)×100) of the total area $S_{SB}$ of the servo bands S to the area S of the surface 13S of the magnetic layer 13 is preferably 4.0% or less, more preferably 3.0% or less, still more preferably 2.0% or less, from the viewpoint of ensuring a high storage capacity. Meanwhile, the lower limit value of the ratio $R_S$ of the total area $S_{SB}$ of the servo bands SB to the area S of the surface of the magnetic layer 13 is preferably 0.8% or greater from the viewpoint of securing 5 or more servo tracks.

The ratio $R_S$ of the total area $S_{SB}$ of the servo bands SB to the area S of the surface 13S of the magnetic layer 13 may be measured, for example, by developing the magnetic recording medium 10 using Ferricolloid developer (manufactured by Sigma Hi-Chemical Inc., Sigmarker Q), and then observing the developed magnetic recording medium 10 with an optical microscope. From the image observed by the optical microscope, a servo bandwidth $W_{SB}$ and the number of the servo bands are measured. Next, the ratio $R_S$ is determined from the following expression.

Ratio $R_S$[%]=(((servo bandwidth $W_{SB}$)×(number of servo bands))/(width of magnetic recording medium 10))×100

The number of servo bands SB is preferably 5 or greater, more preferably 5+4n (where n is a positive integer) or greater. When the number of servo bands SB is 5 or greater, it is possible to suppress an influence on the servo signal caused by the change in the width direction dimension of the magnetic recording medium 10, and to ensure stable recording and reproduction characteristics with fewer off-tracks.

The upper limit value of the servo bandwidth $W_{SB}$ is preferably 95 μm or less, more preferably 60 μm or less, still more preferably 30 μm or less from the viewpoint of ensuring a high storage capacity. The lower limit value of the servo bandwidth $W_{SB}$ is preferably 10 μm or greater from the viewpoint of manufacturing the recording head. The width $W_{SB}$ of the servo bandwidth is determined as follows. First, the magnetic recording medium 10 is developed using Ferricolloid developer (manufactured by Sigma Hi-Chemical Inc., Sigmarker Q). Next, the width $W_{SB}$ of the servo band may be measured by observing the developed magnetic recording medium 10 with an optical microscope.

As illustrated in FIG. 4, the data bands DB are each configurable by a plurality of recording tracks 5 extending along the X-axis direction and aligned so as to be adjacent to each other in the Y-axis direction. The data signals are recorded along the recording tracks 5 in the recording tracks 5. It is to be noted that, in the present technology, the length of one bit in the longitudinal direction of the data signal to be recorded in the data band DB (the distance between magnetization reversals) is typically 48 nm or less. The servo band SB includes a predetermined servo signal recording pattern 6 in which a servo signal is recorded using a servo signal recording device (not illustrated).

FIG. 5 is an enlarged view of the recording tracks 5 in the data band DB. As illustrated in FIG. 5, each of the recording tracks 5 has a predetermined recording track width Wd in the Y-axis direction. The recording track width Wd is typically 3.0 µm or less. It is to be noted that such a recording track width Wd may be measured, for example, by developing the magnetic recording medium 10 using a developer such as Ferricolloid developer, and then observing the developed magnetic recording medium 10 with an optical microscope.

The number of the recording tracks 5 included in each data band DB is, for example, approximately 1000 to 2000.

FIG. 6 is an enlarged view of the servo signal recording pattern 6 in the servo band SB. As illustrated in FIG. 6, the servo signal recording pattern 6 includes a plurality of stripes 7 which are inclined at a predetermined azimuth angle, with respect to the width direction (Y-axis direction). The plurality of stripes 7 is classified into a first stripe group 8 including ones inclined clockwise with respect to the width direction (Y-axis direction), and a second stripe group 9 including ones inclined counterclockwise with respect to the width direction. Note that the shape of such a stripe 7 may be measured by developing the magnetic recording medium 10 using a developer such as Ferricolloid developer, and then observing the developed magnetic recording medium 10 with an optical microscope, for example.

Dashed lines in FIG. 6 illustrate servo trace lines T, which are lines traced on the servo signal recording pattern 6 by a servo read head. The servo trace lines T are set along the longitudinal direction (X-axis direction), and are set at predetermined intervals Ps in the width direction.

The number of the servo trace lines T per servo band SB is, for example, approximately from 30 to 60.

The interval Ps between two adjacent servo trace lines T is the same as the value of the recording track width Wd, and is, for example, 2.0 µm or less. Here, the interval Ps between two adjacent servo trace lines T is a value that determines the recording track width Wd. That is, when the interval Ps between the servo trace lines T is narrowed, the recording track width Wd becomes smaller, and the number of the recording tracks 5 included in each data band DB increases. As a result, the capacity of storing data increases (and vice versa if the interval Ps is enlarged). Therefore, it is necessary to reduce the recording track width Wd in order to increase the storage capacity. However, this also results in a reduction in the interval Ps between the servo trace lines T, making it difficult to accurately trace the adjacent servo trace lines. Therefore, in the present embodiment, a reproduction signal width, i.e., the half width of a solitary waveform in a reproduced waveform of a data signal, is narrowed as described later. It is therefore possible to cope with narrowing of the recording track width Wd.

(Friction Coefficient Ratio ($\mu_B/\mu_A$))

A friction coefficient ratio ($\mu B/\mu A$) between a dynamic friction coefficient µA and a dynamic friction coefficient µB is preferably 1.0 or greater and 2.1 or less, more preferably 1.2 or greater and 1.8 or less. The dynamic friction coefficient µA is a dynamic friction coefficient between the surface 13S of the magnetic layer 13 of the magnetic recording medium 10 and the magnetic head in a case where a tension of 0.4 N is applied in the longitudinal direction of the magnetic recording medium 10. The dynamic friction coefficient µB is a dynamic friction coefficient between the surface 13S of the magnetic layer 13 of the magnetic recording medium 10 and the magnetic head in a case where a tension of 1.2 N is applied in the longitudinal direction of the magnetic recording medium 10. When the friction coefficient ratio (µB/µA) is 1.0 or greater and 2.1 or less, it is possible to reduce a change in the dynamic friction coefficient due to a variation in tension at the time of traveling, and thus to stabilize the travel of the magnetic recording medium 10.

The dynamic friction coefficient µA and the dynamic friction coefficient µB for calculating the friction coefficient ratio (µB/µA) are determined as follows. First, as illustrated in FIG. 7, the magnetic recording medium 10 having a width of ½ inches is placed on two cylindrical guide rolls 91 and 92 each having a diameter of 1 inch and being parallel to each other and spaced from each other such that the surface 13S of the magnetic layer 13 is in contact with the guide rolls 91 and 92. The positional relationship between two guide rolls 91 and 92 is fixed.

Next, the magnetic recording medium 10 is brought into contact with a head block 93 (for recording and reproducing) mounted on LTO5 drive, such that the surface 13S of the magnetic layer 13 is in contact with the head block 93 and a holding angle θ1[°] becomes 5.6°. One end of the magnetic recording medium 10 is held by a holding jig 94 and connected to a movable strain gauge 95. Additionally, a weight 96 is suspended at the other end of the magnetic recording medium 10 so that a tension T0 of 0.4 N is imparted thereto. Note that the head block 74 is fixed at a position where the holding angle θ1[° ] is 5.6°. As a result, the positional relationship between the guide rolls 91 and 92 and the head block 93 is also fixed.

The movable strain gauge 95 then causes the magnetic recording medium 10 to slide 60 mm toward the movable strain gauge 95 at a rate of 10 mm/s relative to the head block 93. The output value (voltage) of the movable strain gauge 95 at the time of sliding is converted into T[N] on the basis of a previously acquired linear relationship between the output value and the load (to be described later). From the start to the stop of the sliding in 60 mm, T[N] is acquired 13 times. Eleven T[N] except the leading one and the trailing one are simply averaged to obtain Tave [N]. Thereafter, the dynamic friction coefficient µA is determined from the following expression.

$$\mu_A = \frac{1}{(\theta_1[°] \times (\Pi/180)} \times \ln\left(\frac{T_{ave}[N]}{T_0[N]}\right) \qquad \text{[Expression 1]}$$

The above-described linear relationship is determined as follows. That is, the output value (voltage) of the movable strain gauge 95 is obtained for each of the case of applying a load of 0.4 N to the movable strain gauge 95 and the case of applying a load of 1.5 N to the movable strain gauge 95. From the two obtained output values and the two loads, the linear relationship between the output value and the load is obtained. Using the linear relationship, the output value (voltage) of the movable strain gauge 95 at the time of sliding is converted into T[N] as described above.

The dynamic friction coefficient μB is measured in the same manner as in the method of measuring the dynamic friction coefficient μA except that the tension T0 applied to the other end of the magnetic recording medium 10 is 1.2 N.

From the dynamic friction coefficient μA and the dynamic friction coefficient μB measured as described above, the friction coefficient ratio (μB/μA) is calculated.

Assuming that a dynamic friction coefficient between the surface 13S of the magnetic layer 13 and the magnetic head is μC in a case where a tension of 0.6 N is applied to the magnetic recording medium 10, the friction coefficient ratio (μC (1000)/μC(5)) is preferably 1.0 or greater and 1.8 or less, more preferably 1.0 or greater and 1.6 or less, where μC(5) is the dynamic friction coefficient in the fifth travel from the start of traveling, and μC(1000) is the dynamic friction coefficient in the 1000th travel from the start of traveling. When the friction coefficient ratio (μC(1000)/μC (5)) is 1.0 or greater and 1.8 or less, it is possible to reduce a change in the dynamic friction coefficient due to the multiple travels, and thus to stabilize the travel of the magnetic recording medium 10. Here, the magnetic head used is configured to drive in conformance to the magnetic recording medium 10.

(Friction Coefficient Ratio ($\mu_{C(100)}/\mu_{C(5)}$))

The dynamic friction coefficient μC(5) and the dynamic friction coefficient μC(1000) for calculating the friction coefficient ratio (μC(1000)/μC(5)) is determined as follows.

The friction coefficient ratio ($\mu_{C(1000)}/\mu_{C(5)}$) of the magnetic recording medium 10 is preferably 1.0 to 2.0, more preferably 1.0 to 1.8, still more preferably 1.0 to 1.6, where $\mu_{C(5)}$ is the dynamic friction coefficient in the fifth reciprocation in a case where the magnetic recording medium to which a tension of 0.6 N is applied is reciprocated five times in the longitudinal direction on the magnetic head, and $\mu_{C(1000)}$ is the dynamic friction coefficient of the 1000th reciprocation in a case where the magnetic recording medium is reciprocated 1000 times on the magnetic head. Since the friction coefficient ratio ($\mu_{C(1000)}/\mu_{C(5)}$) is within the above-described numerical ranges, it is possible to reduce the change in the dynamic friction coefficient due to the multiple travels, and thus to stabilize the travel of the magnetic recording medium 10.

The dynamic friction coefficient $\mu_{C(5)}$ and the dynamic friction coefficient $\mu_{C(1000)}$ for calculating the friction coefficient ratio ($\mu_{C(1000)}/\mu_{C(5)}$) are determined as follows. The magnetic recording medium 10 is connected to the movable strain gauge 71 in the same manner as in the measuring method of the dynamic friction coefficient μA except that the tension T0 [N] applied to the other end of the magnetic recording medium 10 is 0.6 N. Then, the magnetic recording medium 10 is caused to slide 60 mm toward the movable strain gauge at a rate of 10 mm/s with respect to the head block 74 (in an outward trip), and is caused to slide 60 mm away from the movable strain gauge (in a return trip). This reciprocating operation is repeated 1000 times. From the start to the stop of sliding in 60 mm in the fifth outward trip out of the 1000 reciprocating operations, the output value (voltage) of the strain gauge is acquired 13 times. The obtained output values are converted into T[N] on the basis of the linear relationship between the output value and the load determined using the dynamic friction coefficient μA (described later). Eleven T[N] except the leading one and the trailing one are simply averaged into Tave[N]. The dynamic friction coefficient $\mu_{C(5)}$ is determined by the following expression.

$$\mu_{c(s)} = \frac{1}{(\theta_1[^\circ] \times (\Pi/180))} \times \ln\left(\frac{T_{ave}[N]}{T_0[N]}\right) \qquad \text{[Expression 2]}$$

Furthermore, the dynamic friction coefficient $\mu_{C(1000)}$ is determined in the same manner as for the dynamic friction $\mu_{C(5)}$ except that 1000th outward trip is measured. From the dynamic friction coefficient $\mu_{C(5)}$ and the dynamic friction coefficient $\mu_{C(1000)}$ measured as described above, the friction coefficient ratio $\mu_{C(1000)}/\mu_{C(5)}$ is calculated.

1-2 Method of Manufacturing Magnetic Recording Medium 10

Next, a method of manufacturing the magnetic recording medium 10 having the above-described configuration will be described. First, a coating material for forming an underlayer is prepared by kneading and dispersing non-magnetic powders, a binder, a lubricant, and the like in a solvent. Next, a coating material for forming a magnetic layer is prepared by kneading and dispersing magnetic powders, a binder, a lubricant, and the like in a solvent. Next, a coating material for forming a back layer is prepared by kneading and dispersing a binder, non-magnetic powders, or the like in a solvent. To prepare the coating material for forming a magnetic layer, the coating material for forming an underlayer, and the coating material for forming a back layer, the following solvents, a dispersion apparatus, and a kneading apparatus may be used, for example.

Examples of the solvent used for preparing the above-mentioned coating materials include: a ketone-based solvent, such as acetone, methyl ethyl ketone, methyl isobutyl ketone, or cyclohexanone; an alcohol-based solvent, such as methanol, ethanol, or propanol; an ester-based solvent, such as methyl acetate, ethyl acetate, butyl acetate, propyl acetate, ethyl lactate, or ethylene glycol acetate; an ether-based solvent, such as diethylene glycol dimethyl ether, 2-ethoxy-ethanol, tetrahydrofuran, or dioxane; an aromatic hydrocarbon solvent, such as benzene, toluene, or xylene; and a halogenated hydrocarbon solvent, such as methylene chloride, ethylene chloride, carbon tetrachloride, chloroform, or chlorobenzene, for example. These may be used alone, and may be used in combination as appropriate.

Examples of the kneading apparatus used for the preparation of the above-mentioned coating materials may include, for example but not particularly limited to, a continuous twin-screw kneader, a continuous twin-screw kneader allowing for dilution in multiple stages, a kneader, a pressure kneader, a roll kneader, and other kneading apparatuses. Additionally, examples of the dispersing apparatus used for the preparation of the above-mentioned coating materials may include, for example but not particularly limited to, a roll mill, a ball mill, a transverse sand mill, a longitudinal sand mill, a spike mill, a pin mil, a tower mil, a pearl mill (e.g., DCP mill manufactured by Eirich Co., Ltd., etc.), a homogenizer, an ultrasonic disperser, and other dispersing apparatuses.

Next, the coating material for forming an underlayer is applied to one main surface 11A of the base 11 and dried to form the underlayer 12. Subsequently, the coating material for forming a magnetic layer is applied onto the underlayer 12 and dried to form the magnetic layer 13 on the underlayer 12. Note that, during the drying, it is preferable to cause the magnetic field of the magnetic powders to be oriented in the thickness direction of the base 11 by a solenoidal coil, for example. Alternatively, during the drying, the magnetic field of the magnetic powders may be oriented in the traveling direction (longitudinal direction) of the base 11, and thereafter oriented in the thickness direction of the base 11 by a solenoidal coil, for example. Such a magnetic field orientation process makes it possible to improve the degree of perpendicular orientation (i.e., the squareness ratio S1) of the magnetic powders. After the magnetic layer 13 is formed, the coating material for forming a back layer is applied to the other main surface 11B of the base 11 and dried to form the back layer 14. The magnetic recording medium 10 is thereby obtained.

The squareness ratios S1 and S2 and the rate Hc2/Hc1 are set to desired values by, for example, adjusting the intensity of the magnetic field applied to the coated film made of the coating material for forming a magnetic layer, the concentration of a solid content in the coating material for forming a magnetic layer, and drying conditions (drying temperatures and drying times) for the coated film made of the coating material for forming a magnetic layer. The intensity of the magnetic field applied to the coated film is preferably at least twice the coercivity of the magnetic powders. To further increase the squareness ratio S1 (that is, to further lower the squareness ratio S2), it is preferable to improve the dispersing state of the magnetic powders in the coating material for forming a magnetic layer. Further, to further increase the squareness ratio S1, it is also effective to magnetize the magnetic powders at a stage prior to the application of the coating material for forming a magnetic layer to an alignment apparatus for causing the magnetic field of the magnetic powders to be oriented. It is to be noted that the above-mentioned methods of adjusting the squareness ratios S1 and S2 may be used alone, or two or more of them may be used in combination.

Thereafter, the obtained magnetic recording medium 10 is subjected to a calendering process to smooth the surface 13S of the magnetic layer 13. Next, the magnetic recording medium 10 after the calendering process is rolled up, and then subjected to a heat treatment while the magnetic recording medium 10 is in this state, to transfer a plurality of projections of on the surface 14S of the back layer 14 onto the surface 13S of the magnetic layer 13. As a result, multiple pores are formed in the surface 13S of the magnetic layer 13.

The temperature of the heat treatment is preferably 50° C. or higher and 80° C. or lower. When the temperature of the heat treatment is 50° C. or higher, it is possible to obtain favorable transfer properties. In contrast, when the temperature of the heat treatment is 80° C. or lower, the number of the pores becomes too large, which may cause too much lubricant to be applied on the surface 13S of the magnetic layer 13. Here, the temperature of the heat treatment is the temperature of an atmosphere in which the magnetic recording medium 10 is held.

The time of the heat treatment is preferably 15 hours or longer and 40 hours or shorter. When the time of the heat treatment is 15 hours or longer, it is possible to obtain favorable transfer properties. Meanwhile, when the time of the heat treatment is 40 hours or shorter, it is possible to suppress a decrease in productivity.

Further, the pressure applied to the magnetic recording medium 10 during the heat treatment is preferably in a range from 150 kg/cm to 400 kg/cm inclusive.

Finally, the magnetic recording medium 10 is cut into a predetermined width (e.g., ½ inch wide). The magnetic recording medium 10 is thereby obtained as desired.

1-3 Configuration of Recording and Reproducing Apparatus 30

Now described referring to FIG. 8 is the configuration of a recording and reproducing apparatus 30 for recording information in the above-described magnetic recording medium 10 and reproducing information from the above-described magnetic recording medium 10.

The recording and reproducing apparatus 30 has a configuration in which a tension applied in the longitudinal directions of the magnetic recording medium 10 is adjustable. Additionally, the recording and reproducing apparatus 30 has a configuration in which a magnetic recording medium cartridge 10A is loadable. Here, for ease of explanation, the recording and reproducing apparatus 30 has a configuration in which one magnetic recording medium cartridge 10A is loadable. However, in the present disclosure, the recording and reproducing apparatus 30 may have a configuration in which a plurality of magnetic recording medium cartridges 10A is loadable. As described above, the magnetic recording medium 10 may have a tape-like shape, and may be, for example, an elongated magnetic recording medium tape. The magnetic recording medium 10 may be accommodated in a housing in the state of being wound around a reel inside the magnetic recording medium cartridge 10A, for example. The magnetic recording medium 10 is configured to travel in the longitudinal direction during recording and reproduction. Further, the magnetic recording medium 10 may be configured to record signals at a shortest recording wavelength of preferably 100 nm or less, more preferably 75 nm or less, still more preferably 60 nm or less, particularly preferably 50 nm or less. The magnetic recording medium 10 may be used in the recording and reproducing apparatus 30 having, for example, a shortest recording wavelength within the above ranges. The recording track width may be, for example, 2 μm or less.

The recording and reproducing apparatus 30 is coupled to information processing apparatuses, such as servers 41 and personal computers 42 (hereinafter referred to "PCs"), via a network 43, for example. The recording and reproducing apparatus 30 is configured to record data supplied from these information processing apparatuses in the magnetic recording medium cartridge 10A.

As illustrated in FIG. 8, the recording and reproducing apparatus 30 includes a spindle 31, a reel 32, a driving device 33, a driving device 34, a plurality of guide rollers 35, a head unit 36, a communication interface (hereinafter referred to as I/F) 37, and a control device 38.

The spindle 31 is configured such that the magnetic recording medium cartridge 10A is mountable thereon. The magnetic recording medium cartridge 10A conforms to the LTO (Linear Tape Open) standard, and has a cartridge case 10B rotatably accommodating a single reel 10C around which the magnetic recording medium 10 is wound. An inverted V-shaped servo pattern is preliminarily recorded, as a servo signal, in the magnetic recording medium 10. The reel 32 is configured to fix a leading end of the magnetic recording medium 10 drawn out from the magnetic recording medium cartridge 10A.

The driving device 33 is a device for rotationally driving the spindle 31. The driving device 34 is a device for rotationally driving the reel 32. When data is recorded in or reproduced from the magnetic recording medium 10, the drive device 33 and the drive device 34 respectively rotate the spindle 31 and the reel 32 to cause the magnetic recording medium 10 to travel. The guide rollers 35 are rollers for guiding the travel of the magnetic recording medium 10.

The head unit 36 includes a plurality of recording heads for recording data signals in the magnetic recording medium 10, and a plurality of reproducing heads for reproducing data signals recorded in the magnetic recording medium 10. For example, a ring-type head may be used as the recording head, and a magneto-resistive effect-type magnetic head may be used as the reproducing head, for example. However, the types of the recording head and the reproducing head are not limited thereto.

The I/F 37 is for communicating with the information processing apparatuses such as the servers 41 and the PCs 42, and is connected to the network 43.

The control device 38 controls the entire recording and reproducing apparatus 30. For example, the control device 38 records data signals supplied from the information processing apparatuses in the magnetic recording medium 10 using the head unit 36 in response to requests from the information processing apparatuses such as the servers 41 and the PCs 42. Further, the control device 38 reproduces the data signal recorded in the magnetic recording medium 10 using the head unit 36 in response to requests from the information processing apparatuses such as the servers 41 and the PCs 42, and supplies the reproduced data signals to the information processing apparatuses.

1-4 Effects

As described above, the magnetic recording medium 10 of the present embodiment is a tape-like member in which the base 11, the underlayer 12, and the magnetic layer 13 are laminated in this order. The magnetic recording medium 10 satisfies each of the configuration requirements (1) to (9) described below.

(1) The base 11 contains polyester as a main constituent.
(2) The magnetic layer 13 is provided on the base 11, contains a plurality of magnetic powders, and is configured to record data signals.
(3) An average thickness of the magnetic recording medium is 5.6 μm or less.
(4) An average thickness of the base is 4.2 μm or less.
(5) An average thickness of the magnetic layer 13 is 90 nm or less.
(6) An average aspect ratio of the magnetic powders in the magnetic layer 13 is 1.0 or greater and 3.0 or less.
(7) The coercivity Hc1 in the perpendicular direction is 3000 Oe or less.
(8) The rate Hc2/Hc1 of the coercivity Hc2 in the longitudinal direction to the coercivity Hc1 in the perpendicular direction is 0.8 or less.
(9) The entire BET-specific surface area of the magnetic recording medium from which the lubricant has been removed is 2.5 m$^2$/g or greater.

With the magnetic recording medium 10 of the present embodiment having such a configuration, it is possible to ensure favorable electromagnetic conversion characteristics (e.g., C/N) while keeping the magnetization transition width steep. Further, when recording and/or reproducing is repeatedly performed, it is possible to allow the lubricant to stably present on the surface of the magnetic recording medium, and thus to suppress an increase in friction due to the sliding. Further, since the average thickness of the magnetic recording medium 10 is 5.6 μm or less, and the average thickness of the base 11 is 4.2 μm or less, it is possible to further increase the storage capacity per magnetic recording medium cartridge 10A (see FIG. 8) in which the data is to be recorded, than ever. Therefore, it is possible to achieve a configuration advantageous for high-density recording.

Further, in the case of the magnetic recording medium 10 of the present embodiment, when the BET specific surface area of the entire magnetic recording medium from which the lubricant has been removed is 3.0 m$^2$/g or greater, it is possible to reduce the friction coefficient ratio (μB/μA) as compared with the case in which the BET specific surface area is less than 3.0 m$^2$/g. The change in the dynamic friction coefficient due to a variation in tension at the time of traveling thereby becomes smaller, which makes it possible to stabilize the travel of the magnetic recording medium 10.

Further, in the case of the magnetic recording medium 10 of the present embodiment, when the BET specific surface area of the entire magnetic recording medium from which the lubricant has been removed is 3.5 m$^2$/g or greater, it is possible to further reduce the friction coefficient ratio (μB/μA) as compared with the case in which the BET specific surface area is less than 3.5 m$^2$/g. The change in the dynamic friction coefficient due to a variation in tension at the time of traveling thereby becomes smaller, which makes it possible to stabilize the travel of the magnetic recording medium 10. In particular, when the entire BET-specific surface area of the magnetic recording medium from which the lubricant has been removed is 4.0 m$^2$/g or greater, it is possible to further stabilize the travel of the magnetic recording medium 10.

Further, in the case of the magnetic recording medium 10 of the present embodiment, when the friction coefficient ratio (μC(1000)/μC(5)) is 1.0 or greater and 1.8 or less, it is possible to reduce the change in the dynamic friction coefficient due to the multiple travels, and thus to stabilize the travel of the magnetic recording medium 10.

Further, in the case of the magnetic recording medium 10 of the present embodiment, when the average particle diameter of the magnetic powders is 8 nm or greater and 22 nm or less, it is possible to obtain favorable electromagnetic conversion characteristics (e.g., SNR) of the magnetic recording medium 10.

Further, in the case of the magnetic recording medium 10 of the present embodiment, when the average particle volume of the plurality of magnetic powders is 2300 nm$^3$ or less, it is possible to narrow the half width of a solitary waveform in the reproduced waveform of the data signal, and thus to sharpen the peak of the reproduced waveform of the data signal. This improves the accuracy in reading the data signal. It therefore is possible to improve the recording density of the data by increasing the number of the recording tracks.

Further, in the case of the magnetic recording medium 10 of the present embodiment, when the arithmetic mean roughness Ra of the surface of the magnetic layer 13 is 2.5 nm or less, it is possible to obtain excellent electromagnetic conversion characteristics. Additionally, when the PSD up to a spatial wavelength of 5 μm is 2.5 μm or less, it is possible to reduce a spacing between the recording/reproducing head and the tape-like magnetic recording medium 10 at the time of recording or reproducing, making the magnetic recording medium 10 suitable for high recording density.

Further, in the magnetic recording medium 10 of the present embodiment, when the coercivity in the longitudinal direction is 2000 Oe or less, a high-sensitivity magnetization reaction is caused by a magnetic field in the perpendicular direction from the recording head, allowing for the formation of a favorable recording pattern.

Further, in the case of the magnetic recording medium 10 of the present embodiment, since the rate Hc2/Hc1 of the coercivity Hc2 in the longitudinal direction to the coercivity Hc1 in the perpendicular direction satisfies the relationship of Hc2/Hc1≤0.7, it is possible to increase the degree of perpendicular orientation of the magnetic powders. Therefore, it is possible to reduce the magnetization transition width, and to obtain a high output signal at the time of signal reproduction. This allows for an improvement in the electromagnetic conversion characteristics (e.g., C/N).

Further, in the case of the magnetic recording medium 10 of the present embodiment, when the coercivity Hc1 in the perpendicular direction is 2200 Oe or greater, it is possible to suppress the deterioration of the electromagnetic conversion characteristics (e.g., C/N) in a high-temperature environment due to influences of thermal disturbances and demagnetizing fields.

2. MODIFICATION EXAMPLES

Modification Example 1

In the embodiment described above, the ε-iron oxide particle 20 including the shell portion 22 of a two-layer structure (FIG. 2) has been exemplified and described. However, the magnetic recording medium of the present technology may include an s-iron oxide particle 20A including a shell portion 23 of a single layer structure, as illustrated in FIG. 19, for example. The shell portion 23 of the s-iron oxide particle 20A has, for example, the same configuration as the first shell portion 22a. However, from the viewpoint of suppressing the characteristic deterioration, the s-iron oxide particle 20 having the shell portion 22 of the two-layer structure described in the embodiment described above is more preferable than the ε-iron oxide particle 20A of Modification Example 1.

Modification Example 2

In the magnetic recording medium 10 of the embodiment described above, the s-iron oxide particle 20 having a core-shell structure has been exemplified and described. However, the s-iron oxide particle may contain an additive instead of the core-shell structure, or may have the core-shell structure and an additive. In this case, a part of Fe of the s-iron oxide particle is replaced with an additive. With the s-iron oxide particle including an additive, it is also possible to adjust the coercivity Hc of the entire s-iron oxide particle to a coercivity Hc suitable for recording, and to improve the ease of recording. The additive is a metal element other than iron, preferably a trivalent metal element, more preferably at least one of Al (aluminum), Ga (gallium) or In (indium), still more preferably at least one of Al or Ga.

Specifically, the ε-iron oxide including an additive is ε-$Fe_2$-$xMxO_3$ crystals (where M is a metal element other than iron, preferably a trivalent metal element, more preferably at least one of Al, Ga or In, still more preferably at least one of Al or Ga, and x satisfies, for example, $0<x<1$).

Modification Example 3

The magnetic powders of the present disclosure may include nanoparticle powders that contain hexagonal ferrite (hereinafter referred to as "hexagonal ferrite particle") instead of the s-iron oxide particle powders. The hexagonal ferrite particle has a hexagonal plate-like or substantially hexagonal plate-like shape, for example. The hexagonal ferrite includes preferably at least one of Ba (barium), Sr (strontium). Pb (lead) or Ca (calcium), more preferably at least one of Ba or Sr. Specifically, the hexagonal ferrite may be barium ferrite or strontium ferrite, for example. The barium ferrite may further include at least one of Sr, Pb, or Ca in addition to Ba. The strontium ferrite may further include at least one of Ba, Pb or Ca in addition to Sr.

More specifically, the hexagonal ferrite has an average composition represented by a general formula $MFe_{12}O_{19}$, where M is, for example, at least one metal of Ba, Sr, Pb or Ca, preferably at least one metal of Ba or Sr. M may be a combination of Ba and one or more metals selected from the group consisting of Sr, Pb, and Ca. Alternatively, M may be a combination of Sr and one or more metals selected from the group consisting of Ba, Pb, and Ca. In the above general formula, part of Fe may be replaced with another metal element.

When the magnetic powders include hexagonal ferrite particle powders, the average particle size of the magnetic powders is preferably 50 nm or less, more preferably 40 nm or less, still more preferably 30 nm or less. More preferably, the average particle size of the magnetic powders is 25 nm or less, 22 nm or less, 21 nm or less, or 20 nm or less. Additionally, the average particle size of the magnetic powders is, for example, 10 nm or greater, preferably 12 nm or greater, still preferably 15 nm or greater. Therefore, the average particle size of the magnetic powders including the hexagonal ferrite particle powders may be, for example, 10 nm or greater and 50 nm or less, 10 nm or greater and 40 nm or less, 12 nm or greater and 30 nm or less, 12 nm or greater and 25 nm or less, or 15 nm or greater and 22 nm or less. When the average particle size of the magnetic powders is equal to or smaller than the above-described upper limit value (e.g., 50 nm or less, particularly 30 nm or less), it is possible to obtain favorable electromagnetic conversion characteristics (e.g., SNRs) of the magnetic recording medium 10 with a high recording density. When the average particle size of the magnetic powders is equal to or larger than the above-described lower limit value (e.g., 10 nm or greater, preferably 12 nm or greater), it is possible to further improve the dispersibility of the magnetic powders and to obtain more excellent electromagnetic conversion characteristics (e.g., SNR).

When the magnetic powders include hexagonal ferrite particle powders, the average aspect ratio of the magnetic powders may be preferably 1 or greater and 3.5 or less, more preferably 1 or greater and 3.1 or less or 2 or greater and 3.1 or less, still more preferably 2 or greater and 3 or less. Since the average aspect ratio of the magnetic powders is within the above-described numerical ranges, it is possible to suppress aggregation of the magnetic powders. Further, when the magnetic powders is oriented perpendicularly in the process of forming the magnetic layer 13, it is possible to suppress the resistance applied to the magnetic powders. This may improve the perpendicular orientation of the magnetic powders.

Incidentally, the average particle size and the average aspect ratio of the magnetic powder including hexagonal ferrite particle powders are determined as follows. First, the magnetic recording medium 10 to be measured is processed by the FIB (Focused Ion Beam) method or the like into a thin piece. The thinning is performed along the length direction (longitudinal direction) of the magnetic tape. The cross-section of the obtained thin sample piece is observed using a transmission electron microscope (H-9500 manufactured by Hitachi High-Technologies) at an acceleration voltage of 200 kV and total magnification of 500,000 times, in such a manner that the recording layer is entirely included in the thickness direction of the recording layer. Next, 50 particles having a side face oriented toward the surface to be observed are selected from a TEM photograph captured, and the maximum plate thickness DA of each of the particles is measured. The maximum plate thicknesses DA obtained in such a manner are simply averaged (arithmetically averaged) to determine an average maximum plate thickness DAave. Subsequently, the plate diameter DB of each of the magnetic powders is measured. Here, the plate diameter DB refers to the maximum distance between any two parallel lines drawn from any angles so as to contact the contour of the magnetic powder (so-called maximum Feret diameter). Subsequently, the measured plate diameter DB is simply averaged (arithmetically averaged) to determine an average plate diameter DBave. Then, an average aspect ratio (DBave/DAave) of the particles is determined from the average maximum plate thickness DAave and the average plate diameter DBave.

When the magnetic powders includes hexagonal ferrite particle powders, the average particle volume of the magnetic powders is preferably 5900 nm$^3$ or less, more preferably 500 nm$^3$ or greater and 3400 nm$^3$ or less, still more preferably 1000 nm$^3$ or greater and 2500 nm$^3$ or less. When the average particle volume of the magnetic powders is 5900 nm$^3$ or less, the same effect as in the case where the average particle size of the magnetic powders is 30 nm or less is obtained. Meanwhile, when the average particle volume of the magnetic powders is 500 nm$^3$ or greater, the same effect as in the case where the average particle size of the magnetic powders is 12 nm or greater.

Note that the average particle volume of the magnetic powders is determined as follows. First, the average maximum plate thickness DAave and the average maximum plate diameter DBave are determined by the method of calculating the average particle size of the magnetic powders described above. Next, an average volume V of the s-iron oxide particles is determined by the following expression:

$$V = \frac{3\sqrt{3}}{8} \times DA_{ave} \times DB_{ave} \times DB_{ave} \quad \text{[Expression 3]}$$

According to a particularly preferred embodiment of the present technology, the magnetic powders may be barium ferrite magnetic powders or strontium ferrite magnetic powders, more preferably barium ferrite magnetic powders. The barium ferrite magnetic powders include magnetic particles of iron oxide having barium ferrite as a main phase (hereinafter referred to as "barium ferrite particles"). The barium ferrite magnetic powders have high reliability of the data recording; for example, the coercivity does not decrease even in a high temperature and humidity environment. From this viewpoint, the barium ferrite magnetic powders are preferable as the magnetic powders.

An average particle size of the barium ferrite magnetic powders is 50 nm or less, more preferably 10 nm or greater and 40 nm or less, still more preferably 12 nm or greater and 25 nm or less.

When the magnetic layer 13 includes the barium ferrite magnetic powders as the magnetic powders, an average thickness tm [nm] of the magnetic layer 13 is preferably 35 nm≤tm≤100 nm, particularly preferably 80 nm or less. Additionally, the coercivity Hc measured in the thickness direction (perpendicular direction) of the magnetic recording medium 10 is preferably 160 kA/m or greater and 280 kA/m or less, more preferably 165 kA/m or greater and 275 kA/m or less, still more preferably 170 kA/m or greater and 270 kA/m or less.

Modification Example 4

The magnetic powders may include nanoparticles containing Co-containing spinel ferrite (hereinafter referred to as "cobalt ferrite particles"), instead of the s-iron oxide particle powders. The cobalt ferrite particles preferably have uniaxial anisotropy.

The cobalt ferrite particles, for example, have a cubic or substantially cubic shape. The Co-containing spinel ferrite may further include at least one of Ni, Mn, Al, Cu or Zn in addition to Co.

The Co-containing spinel ferrite has, for example, an average composition represented by the following formula:

(where, in Expression (1), M is, for example, a metal of at least one of Ni, Mn, Al, Cu or Zn, x is a value within the range of 0.4≤x≤1.0, y is a value within the range of 0≤y≤0.3. Note that x and y satisfy the relationship (x+y)≤1.0, z is a value within the range of 3≤z≤4, and Fe may be partially replaced with another metal element).

When the magnetic powders include cobalt ferrite particle powders, the average particle size of the magnetic powders is preferably 25 nm or less, more preferably 10 nm or greater and 23 nm or less. When the average particle size of the magnetic powders is 25 nm or less, it is possible to obtain favorable electromagnetic conversion characteristics (e.g., SNRs) of the magnetic recording medium 10 with a high recording density. Meanwhile, when the average particle size of the magnetic powders is 10 nm or greater, it is possible to further improve the dispersibility of the magnetic powders and to obtain more excellent electromagnetic conversion characteristics (e.g., SNR). When the magnetic powders include the cobalt ferrite particle powders, the average aspect ratio of the magnetic powders is the same as that of the embodiment described above. Additionally, the average particle size and the average aspect ratio of the magnetic powders are also determined in the same manner as the calculation method of the embodiment described above.

The average particle volume of the magnetic powders is preferably 15000 nm$^3$ or less, more preferably 1000 nm$^3$ or greater and 12000 nm$^3$ or less. When the average particle volume of the magnetic powders is 15000 nm$^3$ or less, it is possible to obtain the same effect as in the case where the average particle size of the magnetic powders is 25 nm or less. Meanwhile, when the average particle volume of the magnetic powders is 1000 nm$^3$ or greater, it is possible to obtain the same effect as in the case where the average particle size of the magnetic powders is 10 nm or greater. Note that the average particle volume of the magnetic powders is determined in the same manner as the method of calculating the average particle volume of the magnetic powders in the embodiment described above (the method of calculating the average particle volume when the ε-iron oxide particle has a cubic shape or a substantially cubic shape).

The coercivity Hc of the cobalt ferrite magnetic powders is preferably 2500 Oe or greater, more preferably 2600 Oe or greater and 3500 Oe or less.

Modification Example 5

As illustrated in FIG. 10, for example, the magnetic recording medium 10 may further include a barrier layer 15 provided on at least one surface of the base 11. The barrier layer 15 is a layer for suppressing a dimensional change of the base 11 depending on an environment. For example, one example cause of the dimensional change is a hygroscopic property of the base 11. It is possible to reduce the rate of water penetration into the base 11 by the deposition of the barrier layer 15. The barrier layer 15 includes, for example, a metal or a metal oxide. Here, the metal may be, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, or Ta. The metal oxide may be, for example, a metal oxide containing one or more of the above metals. More specifically, for example, at least one of $Al_2O_3$, CuO, CoO, $SiO_2$, $Cr_2O_3$, $TiO_2$, $Ta_2O_5$, or $ZrO_2$. In addition, the barrier layer 15 may include diamond-like carbon (DLC) or diamond.

The average thickness of the barrier layer 15 is preferably 20 nm or greater and 1000 nm or less, more preferably 50 nm or greater and 1000 nm or less. The average thickness of the barrier layer 15 is determined in the same manner as for the average thickness of the magnetic layer 13. Note that the magnification of the TEM image is appropriately adjusted depending on the thickness of the barrier layer 15.

Modification Example 6

In the embodiment described above, the case has been described where the plurality of protrusions 14A provided on the surface 14S of the back layer 14 are transferred onto the surface 13S of the magnetic layer 13 to form the multiple pores 13A on the surface 13S of the magnetic layer 13; however, the method of forming the multiple pores 13A is not limited thereto. For example, the multiple pores 13A may be formed on the surface 13S of the magnetic layer 13 by adjusting the type of solvent contained in the coating material for forming a magnetic layer or drying conditions of the coating material for forming a magnetic layer, for example.

Modification Example 7

The magnetic recording medium 10 according to the embodiment described above may be used in a library apparatus. In this case, the library apparatus may include a plurality of recording and reproducing apparatuses 30 of the embodiment described above.

EXAMPLES

Hereinafter, the present disclosure is described in specific with reference to examples. However, the present disclosure is not limited to these examples.

In the following examples and comparative examples, the average aspect ratio of the magnetic powders, the average particle size of the magnetic powders, the average particle volume of the magnetic powders, the average thickness of the underlayer, the average thickness of the entire magnetic recording medium (average tape thickness), the average thickness of the magnetic layer, the coercivity Hc1, the coercivity Hc2, the rate Hc2/Hc1, the entire BET specific surface area of the magnetic recording medium, and the friction coefficient ratio $\mu C(1000)/\mu C(5)$ that are measured in the perpendicular direction, and the arithmetic mean roughness of the surface of the magnetic layer (the magnetic layer Ra) and the magnetic layer PSD ($\leq 0.5$ μm) are the values determined through the measurement method described in the above embodiment.

Example 1

A magnetic recording medium of Example 1 was obtained as follows.

<Preparation Process of Coating Material for Forming Magnetic Layer>

The coating material for forming a magnetic layer was prepared as follows. First, a first composition of the following formulation was kneaded by an extruder. Next, the kneaded first composition and a second composition of the following formulation were added to a stirring tank equipped with a disper to perform preliminary mixing. Subsequently, sand mill mixing was further performed, and a filter treatment was performed to prepare the coating material for forming a magnetic layer.

(First Composition)

The constituents and weight of the first composition are as follows.

Barium ferrite ($BaFe_{12}O_{19}$) particle powders (hexagonal plate shape, average aspect ratio: 2.8, average particle size: 20.3 nm, average particle volume: 1950 $nm^3$); 100 parts by mass Vinyl chloride-based resin (cyclohexanone solution 30% by mass): 40 parts by mass (a cyclohexanone solution is included)

(Polymerization degree: 300, Mn=10,000 and 0.07 mmol/g of $OSO_3K$ and 0.03 mmol/g of secondary OH as a polar group are contained)

Aluminum oxide powders ($\alpha$-$Al_2O_3$, average particle size: 0.2 μm): 5 parts by mass Carbon black (manufactured by Tokai Carbon Co., Ltd., trade name: SEAST TA): 2 parts by mass (Second Composition)

The constituents and weight of the second composition are as follows.

Vinyl chloride-based resin: 20 parts weight (a cyclohexanone solution is included) (Resin solution: resin: 30% by mass, cyclohexanone: 70% by mass)

N-butylstearate as fatty acid ester: 2 parts by mass

Methyl ethyl ketone: 121.3 parts by mass

Toluene: 121.3 parts by mass

Cyclohexanone: 60.7 parts by mass

To the coating material for forming a magnetic layer prepared as described above, 4 parts by mass of polyisocyanate (trade name: Coronate L, manufactured by Nippon Polyurethane Co., Ltd.) as a curing agent, and 2 parts by mass of Stearic Acid as a fatty acid were added.

<Preparation Process of Coating Material for Forming Underlayer>

The coating material for forming an underlayer was prepared as follows. First, a third composition of the following formulation was kneaded by an extruder. Next, the kneaded third composition and a fourth composition of the following formulation were added to a stirring tank equipped with a disper to perform preliminary mixing. Subsequently, sand mill mixing was further performed, and a filter treatment was performed to prepare the coating material for forming an underlayer.

(Third Composition)

The constituents and weight of the third composition are as follows.

Needle-shaped iron oxide powders ($\alpha$-$Fe_2O_3$, average major axis length: 0.15 μm): 100 parts by mass Vinyl chloride-based resin (resin solution: resin: 30% by mass, cyclohexanone: 70% by mass): 55.6 parts by mass Carbon black (average particle size: 20 nm): 10 parts by mass (Fourth Composition)

The constituents and weight of the fourth composition are as follows.

Polyurethane-based resin UR8200 (manufactured by Toyo Boseki.: 18.5 parts by mass)

N-butylstearate as fatty acid ester: 2 parts by mass

Methyl ethyl ketone: 108.2 parts by mass

Toluene: 108.2 parts by mass

Cyclohexanone: 18.5 parts by mass

To the coating material for forming an underlayer prepared as described above, 4 parts by mass of polyisocyanate (trade name: Coronate L, manufactured by Nippon Polyurethane Co., Ltd.) as a curing agent, and 2 parts by mass of Stearic Acid as a fatty acid were added.

<Preparation Process of Coating Material for Forming Back Layer>

The coating material for forming a back layer was prepared as follows. The coating material for forming a back layer was prepared by mixing raw materials described below in a stirring tank equipped with a disper and performing a filter process.

Small particle-diameter carbon black powders (average particle diameter (D50) 20 nm): 90 parts by mass Large particle-diameter carbon black powders (average particle diameter (D50) 270 nm): 10 parts by mass Polyester polyurethane (manufactured by Polyurethane Japan, trade name: N-2304): 100 parts by mass Methyl ethyl ketone: 500 parts by mass Toluene: 400 parts by mass Cyclohexanone: 100 parts by mass <Application Process>

Using the coating material for forming a magnetic layer and the coating material for forming an underlayer prepared as described above, an underlayer having an average thickness of 1.1 µm, and a magnetic layer having an average thickness of 80 nm were formed on one main surface of an elongated polyester film having an average thickness of 4.0 µm and serving as a non-magnetic supporting member, as follows. First, an underlayer was formed by applying the coating material for forming an underlayer on one main surface of a polyester film and drying the coating material. Next, a magnetic layer was formed by applying the coating material for forming a magnetic layer on the underlayer and drying the coating material. Note that, during the drying of the coating material for forming a magnetic layer, the magnetic field of the magnetic powders were oriented in the thickness direction of the film by a solenoid coil. Additionally, the drying conditions (drying temperatures and drying times) for the coating material for forming a magnetic layer were adjusted, and the coercivity Hc1 in the thickness direction (perpendicular direction) and the coercivity Hc2 in the longitudinal direction of the magnetic recording medium were set to the values shown in Table 2 below. Subsequently, a back layer having an average thickness of 0.3 µm was formed by applying the coating material for forming a back layer on the other main surface of the polyester film and drying the coating material.

<Calendering and Transferring Processes>

Subsequently, a calendering process was performed to smooth the surfaces of the magnetic layer. Next, the magnetic recording medium having the magnetic layer with the smoothed surface was rolled up, and then a heat treatment was performed on the magnetic recording medium in the rolled-up state at 60° C. for 10 hours. Then, the magnetic recording medium was rewound into a roll shape such that the end that had been located on the inner circumferential side was located on the outer circumferential side, and then the heat treatment in the rolled-up state was performed again on the magnetic recording medium at 60° C. for 10 hours. This allows multiple protrusions on the surface of the back layer to be transferred onto the surface of the magnetic layer, forming multiple pores on the surface of the magnetic layer.

<Cutting Process>

The magnetic recording medium obtained as described above was cut into ½ inches (12.65 mm) wide to obtain a desired elongated magnetic recording medium (an average thickness of 5.6 µm). The magnetic recording medium has a four-layer structure, as shown in Table 2 below, with a total average thickness of 5.6 µm, the number of servo tracks of 5, and an average thickness of the base (base film) of 4.0 µm. Additionally, W is 2.9 µm, and L is 0.052 µm. The above configuration is referred to as a media configuration 1. In addition, W represents the recording track width, L represents the distance between magnetization reversals of the region recorded at the shortest wavelength (bit length). It is to be noted that the magnetic layer Ra of the obtained magnetic recording medium was 1.9 nm, the magnetic layer PSD was 2.1 µm, and the half-width PW50 of the solitary waveform in the reproduced waveform was 175 nm.

Example 21

In the preparation process of the coating material for forming a magnetic layer, barium ferrite ($BaFe_{12}O_{19}$) particles in the first composition had a powder average aspect ratio of 2.6, an average particle size of 18.6 nm, and an average particle volume of 1600 $nm^3$. Additionally, in the application process, the average thickness of the magnetic layer was 60 nm, the coercivity Hc1 was 2920 Oe, and the coercivity Hc2 was 1920 Oe. Further, in the transferring process, the heating condition was adjusted so that the BET specific surface area was 3.3 $m^2$/g and the friction coefficient ratio µC(1000)/µC(5) was 1.3. Except for the above points, a magnetic recording medium of Example 2 was obtained in the same manner as in Example 1 above. Note that the obtained magnetic recording medium had a magnetic layer Ra of 1.85 nm and a magnetic layer PSD of 2.0 µm.

Example 31

In the preparation process of the coating material for forming a magnetic layer, barium ferrite ($BaFe_{12}O_{19}$) particles in the first composition had a powder average aspect ratio of 3.0, an average particle size of 21.3 nm, and an average particle volume of 2100 $nm^3$. Further, in the transferring process, the heating condition was adjusted so that the BET specific surface area was 3.6 $m^2$/g. Except for the above points, a magnetic recording medium of Example 3 was obtained in the same manner as in Example 1 above. Note that the obtained magnetic recording medium had a magnetic layer Ra of 1.9 nm and a magnetic layer PSD of 2.1 µm.

Example 4

In the application process, a magnetic recording medium of Example 4 was obtained in the same manner as in Example 1 above except that the average thickness of the magnetic layer was 90 nm. Note that the obtained magnetic recording medium had a magnetic layer Ra of 1.9 nm and a magnetic layer PSD of 2.1 µm.

Example 5

In the preparation process of the coating material for forming a magnetic layer, barium ferrite ($BaFe_{12}O_{19}$) particles in the first composition had a powder average aspect ratio of 2.9, an average particle size of 20.9 nm, and an average particle volume of 2050 $nm^3$. Further, in the application process, the coercivity Hc1 was 2980 Oe. Except for the above points, a magnetic recording medium of Example 5 was obtained in the same manner as in Example 1 above. Note that the obtained magnetic recording medium had a magnetic layer Ra of 1.9 nm and a magnetic layer PSD of 2.1 μm.

Example 6

In the preparation process of the coating material for forming a magnetic layer, ε-iron oxide particle powders (spherical, average aspect ratio: 1.3, average particle size: 15.7 nm, particle volume: 2050 $nm^3$) were used as magnetic powders. Additionally, in the application process, the coercivity Hc1 was 2850 Oe, and the coercivity Hc2 was 2020 Oe. Further, in the transferring process, the heat condition was adjusted so that the BET specific surface area was 3.6 $m^2/g$. Except for the above points, a magnetic recording medium of Example 6 was obtained in the same manner as in Example 1 above. Note that the obtained magnetic recording medium had a magnetic layer Ra of 2 nm and a magnetic layer PSD of 2.1 μm.

Example 7

In the preparation process of the coating material for forming a magnetic layer, cobalt ferrite powders (cubic, average aspect ratio: 1.1, average particle size: 12.6 nm, particle volume: 2030 $nm^3$) were used as magnetic powders. Additionally, in the application process, the coercivity Hc1 was 2800 Oe, and the coercivity Hc2 was 2020 Oe. Further, in the transferring process, the heat condition was adjusted so that the BET specific surface area was 3.6 $m^2/g$. Except for the above points, a magnetic recording medium of Example 7 was obtained in the same manner as in Example 1 above. Note that the obtained magnetic recording medium had a magnetic layer Ra of 2 nm and a magnetic layer PSD of 2.1 μm.

Example 8

In the preparation process of the coating material for forming a magnetic layer, barium ferrite ($BaFe_{12}O_{19}$) particles in the first composition had a powder average aspect ratio of 2.3, an average particle size of 17 nm, and an average particle volume of 1400 $nm^3$. Additionally, in the application process, the average thickness of the magnetic layer was 60 nm, the coercivity Hc1 was 2550 Oe, and the coercivity Hc2 was 1820 Oe. Further, in the transferring process, the heat condition was adjusted so that the BET specific surface area was 3.2 $m^2/g$. Except for the above points, a magnetic recording medium of Example 8 was obtained in the same manner as in Example 1 above. Note that the obtained magnetic recording medium had a magnetic layer Ra of 1.8 nm and a magnetic layer PSD of 1.9 μm.

Example 91

In the preparation process of the coating material for forming a magnetic layer, barium ferrite ($BaFe_{12}O_{19}$) particles in the first composition had a powder average aspect ratio of 2.0, an average particle size of 15 nm, and an average particle volume of 1100 $nm^3$. Additionally, in the application process, the average thickness of the magnetic layer was 60 nm, the coercivity Hc1 was 2500 Oe, and the coercivity Hc2 was 1840 Oe. Further, in the transferring process, the heat condition was adjusted so that the BET specific surface area was 3.1 $m^2/g$. Except for the above points, a magnetic recording medium of Example 9 was obtained in the same manner as in Example 1 above. Note that the obtained magnetic recording medium had a magnetic layer Ra of 1.75 nm and a magnetic layer PSD of 1.8 μm, and a half-width PW50 of the solitary waveform in the reproduced waveform was 160 nm.

Example 101

A magnetic recording medium of Example 10 was obtained in the same manner as in Example 1 above except that a media configuration 2 (Table 3) was employed. Note that the obtained magnetic recording medium had a magnetic layer Ra of 1.9 nm and a magnetic layer PSD of 2.1 μm, and a half-width PW50 of the solitary waveform in the reproduced waveform was 175 nm.

Example 111

A media configuration 3 (Table 3) was employed. In the preparation process of the coating material for a magnetic layer, barium ferrite ($BaFe_{12}O_{19}$) particles in the first composition had a powder average aspect ratio of 2.6, an average particle size of 18.6 nm, and an average particle volume of 1600 $nm^3$. Additionally, in the application process, the average thickness of the magnetic layer was 60 nm, the coercivity Hc1 was 2920 Oe, and the coercivity Hc2 was 1920 Oe. The average tape thickness was 5.2 μm. Further, in the transferring process, the heat condition was adjusted so that the BET specific surface area was 3.3 $m^2/g$. Except for the above points, a magnetic recording medium of Example 11 was obtained in the same manner as in Example 1 above. Note that the obtained magnetic recording medium had a magnetic layer Ra of 1.85 nm and a magnetic layer PSD of 2.0 μm.

Example 121

A media configuration 4 (Table 3) was employed. In the preparation process of the coating material for forming a magnetic layer, barium ferrite ($BaFe_{12}O_{19}$) particles in the first composition had a powder average aspect ratio of 2.3, an average particle size of 17 nm, and an average particle volume of 1400 $nm^3$. Additionally, in the application process, the average thickness of the magnetic layer was 60 nm, the coercivity Hc1 was 2550 Oe, and the coercivity Hc2 was 1820 Oe. The average tape thickness was 5.2 μm. Further, in the transferring process, the heat condition was adjusted so that the BET specific surface area was 3.6 $m^2/g$. Except for the above points, a magnetic recording medium of Example 12 was obtained in the same manner as in Example 1 above. Note that the obtained magnetic recording medium had a magnetic layer Ra of 1.8 nm and a magnetic layer PSD of 1.9 μm.

Example 131

A media configuration 5 (Table 3) was employed. In the preparation process of the coating material for forming a magnetic layer, barium ferrite ($BaFe_{12}O_{19}$) particles in the first composition had a powder average aspect ratio of 2.3, an average particle size of 17 nm, and an average particle volume of 1400 $nm^3$. Additionally, in the application process, the average thickness of the magnetic layer was 60 nm, the coercivity Hc1 was 2550 Oe, and the coercivity Hc2 was 1820 Oe. The average tape thickness was 4.5 μm. Further, in the transferring process, the heat condition was adjusted so that the BET specific surface area was 3.3 $m^2/g$. Except for the above points, a magnetic recording medium of Example 13 was obtained in the same manner as in Example 1 above. Note that the obtained magnetic recording medium had a magnetic layer Ra of 1.8 nm and a magnetic layer PSD of 1.9 μm.

Example 141

A media configuration 6 (Table 3) was employed. In the preparation process of the coating material for forming a magnetic layer, barium ferrite ($BaFe_{12}O_{19}$) particles in the first composition had a powder average aspect ratio of 2.0, an average particle size of 15 nm, and an average particle volume of 1100 $nm^3$. Additionally, in the application process, the average thickness of the magnetic layer was 60 nm, the coercivity Hc1 was 2500 Oe, and the coercivity Hc2 was 1840 Oe. The average tape thickness was 4.5 μm. Further, in the transferring process, the heat condition was adjusted so that the BET specific surface area was 3.0 $m^2/g$. Except for the above points, a magnetic recording medium of Example 14 was obtained in the same manner as in Example 1 above. Note that the obtained magnetic recording medium had a magnetic layer Ra of 1.75 nm and a magnetic layer PSD of 1.8 μm.

Example 151

In the application process, the average thickness of the magnetic layer was 90 nm, the coercivity Hc1 was 990 Oe, and the coercivity Hc2 was 1500 Oe. Except for the above points, a magnetic recording medium of Example 15 was obtained in the same manner as in Example 1 above. Note that the obtained magnetic recording medium had a magnetic layer Ra of 1.85 nm and a magnetic layer PSD of 2.0 μm.

Example 161

In the application process, the coercivity Hc1 was 2690 Oe, and the coercivity Hc2 was 2150 Oe. Except for the above points, the magnetic recording medium of Example 16 was obtained in the same manner as in Example 1 above. Note that the obtained magnetic recording medium had a magnetic layer Ra of 1.85 nm and a magnetic layer PSD of 2.0 μm.

Example 171

In the preparation process of the coating material for forming a magnetic layer, ε-iron oxide particle powders (spherical, average aspect ratio: 1.3, average particle size: 15.7 nm, particle volume: 2050 $nm^3$) were used as magnetic powders. Additionally, in the application process, the average thickness of the magnetic layer was 90 nm, the coercivity Hc1 was 2900 Oe, and the coercivity Hc2 was 1950 Oe. Further, in the transferring process, the heat condition was adjusted so that the BET specific surface area was 3.3 $m^2/g$. Except for the above points, a magnetic recording medium of Example 17 was obtained in the same manner as in Example 1 above. Note that the obtained magnetic recording medium had a magnetic layer Ra of 2 nm and a magnetic layer PSD of 2.1 μm.

Example 18

By changing the conditions of the calendering process, the BET specific surface area of the obtained magnetic recording medium was set to 2.5 $m^2/g$, the friction coefficient ratio μC(1000)/μC(5) was set to 1.8, the magnetic layer Ra was set to 1.6 nm, and the magnetic layer PSD was set to 1.7 μm.

Example 191

By changing the conditions of the calendering process, the BET specific surface area of the obtained magnetic recording medium was set to 4.2 $m^2/g$, the friction coefficient ratio μC(1000)/μC(5) was set to 1.1, the magnetic layer Ra was set to 2.4 nm, and the magnetic layer PSD was set to 2.5 μm. The half-width PW50 of the solitary waveform in the reproduced waveform was 175 nm.

Comparative Example 1

In the preparation process of the coating material for forming a magnetic layer, barium ferrite ($BaFe_{12}O_{19}$) particles in the first composition had a powder average aspect ratio of 3.5, an average particle size of 23.6 nm, and an average particle volume of 2450 $nm^3$. Additionally, in the application process, the average thickness of the magnetic layer was 85 nm, and the coercivity Hc1 was 2820 Oe. Except for the above points, a magnetic recording medium of Comparative Example 1 was obtained in the same manner as in Example 1 above. Note that the obtained magnetic recording medium had a magnetic layer Ra of 1.9 nm and a magnetic layer PSD of 2.1 μm.

Comparative Example 2

In the application process, the average thickness of the magnetic layer was 100 nm. Except for the above point, a magnetic recording medium of Comparative Example 2 was obtained in the same manner as in Example 1 above. Note that the obtained magnetic recording medium had a magnetic layer Ra of 1.9 nm and a magnetic layer PSD of 2.1 μm.

Comparative Example 31

In the application process, the average thickness of the magnetic layer was 85 nm, the coercivity Hc1 was 2500 Oe, and the coercivity Hc2 was 2100 Oe. Except for the above points, a magnetic recording medium of Comparative Example 3 was obtained in the same manner as in Example 1 above. Note that the obtained magnetic recording medium had a magnetic layer Ra of 1.9 nm and a magnetic layer PSD of 2.1 μm.

Comparative Example 41

In the preparation process of the coating material for forming a magnetic layer, barium ferrite ($BaFe_{12}O_{19}$) particles in the first composition had a powder average aspect ratio of 3.0, an average particle size of 21.3 nm, and an average particle volume of 2090 $nm^3$. Additionally, in the application process, the coercivity Hc1 was 3100 Oe. Except for the above points, a magnetic recording medium of Comparative Example 4 was obtained in the same manner as in Example 1 above. Note that the obtained magnetic recording medium had a magnetic layer Ra of 1.9 nm and a magnetic layer PSD of 2.1 µm.

Comparative Example 5

In the preparation process of the coating material for forming a magnetic layer, ε-iron oxide particle powders (spherical, average aspect ratio: 1.3, average particle size: 15.7 nm, particle volume: 2050 nm$^3$) were used as magnetic powders. Additionally, in the application process, the coercivity Hc1 was 2550 Oe, and the coercivity Hc2 was 2080 Oe. Except for the above points, the magnetic recording medium of Comparative Example 5 was obtained in the same manner as in Example 1 above. Note that the obtained magnetic recording medium had a magnetic layer Ra of 1.9 nm and a magnetic layer PSD of 2.1 µm.

Comparative Example 61

In the preparation process of the coating material for forming a magnetic layer, cobalt ferrite powders (cubic, average aspect ratio: 1.1, average particle size: 12.6 nm, particle volume: 2030 nm$^3$) were used as magnetic powders. Additionally, in the application process, the coercivity Hc1 was 2450 Oe, and the coercivity Hc2 was 2080 Oe. Except for the above points, a magnetic recording medium of Example 6 was obtained in the same manner as in Example 1 above. Note that the obtained magnetic recording medium had a magnetic layer Ra of 1.9 nm and a magnetic layer PSD of 2.1 µm.

Comparative Example 7

By adjusting the additive for the magnetic layer, an obtained magnetic recording medium had a magnetic layer Ra of 2.55 nm and a magnetic layer PSD of 3.2 µm. Note that the BET specific surface area was 3.7 m$^2$/g, and the friction coefficient ratio µC(1000)/µC(5) was 1.1.

Comparative Example 81

By adjusting the additive for the magnetic layer, an obtained magnetic recording medium had a magnetic layer Ra of 1.66 nm and a magnetic layer PSD of 1.7 µm. Note that the BET specific surface area was 3.4 m$^2$/g, and the friction coefficient ratio µC(1000)/µC(5) was 2.4.

Comparative Example 91

By changing the conditions of the calendering process, an obtained magnetic recording medium had a magnetic layer Ra of 1.3 nm and a magnetic layer PSD of 1.4 µm. Note that the BET specific surface area was 2.4 m$^2$/g, and the friction coefficient ratio µC(1000)/µC(5) was 2.4.

[Evaluation]

The magnetic recording media of Examples 1 to 19 and Comparative Examples 1 to 9 were subjected to the following evaluation.

(C/N)

First, a loop tester (manufactured by Microphysics Co., Ltd.) was used to acquire reproduced signals of the magnetic recording media. The conditions for acquiring the reproduced signals are as follows.

Head: GMR head
Rate: 2 m/s
Reproduced signal: Single recording frequency (10 MHz)
Recording current: Optimum recording current Next, the reproduced signals were incorporated into a spectrum analyzer (spectrum analyze). A reproduced output value at 10 MHz and an average value of the noise at 10 MHz±1 MHz were measured, and the difference between them was defined as C/N. The results are shown in Table 2 in the form of values relative to the C/N of Comparative Example 1 as being 0 dB. Note that, when the C/N is 1.5 dB or greater, it is possible to achieve a medium capable of withstanding short wavelengths and narrow track densities.

Evaluation of the traveling stability is performed by using a recording and reproducing apparatus illustrated in FIG. 8, for example. First, random data are recorded in the entire data region (over the entire width and the entire length of the tape) of the tape, and it is confirmed whether the data are reproducible. Thereafter, a reciprocating travel is performed on a specific area of the tape (in this example, a position up to 20 m from the start of the data recording area on the tape) 20.000 times. After the reciprocating travels, the data recorded in the entire data region (over the entire width and the entire length of the tape) are reproduced again to confirm whether the data is reproducible. Tapes from which the data is reproducible are defined as having good traveling stability. Tapes having poor traveling stability causes problems such as irreproducible servo signals, a higher error rate, and difficulty in reproducing all data.

TABLE 2

| | Magnetic Powder | | | | | | Tape | | |
|---|---|---|---|---|---|---|---|---|---|
| | No. | Composition | Shape of Particle | Average Aspect Ratio | Average Particle Size [nm] | Particle Volume [nm$^3$] | Media Config | Average Thickness of Underlayer [um] | Average Thickness of Tape [um] | Average Thickness of Magnetic Layer [nm] |
| Example 1 | 1A | BaFe$_{12}$O$_{19}$ | plate-like | 2.8 | 20.3 | 1950 | 1 | 1.1 | 5.6 | 80 |
| Example 2 | 2A | BaFe$_{12}$O$_{19}$ | plate-like | 2.6 | 18.6 | 1600 | 1 | 1.1 | 5.6 | 60 |
| Example 3 | 3A | BaFe$_{12}$O$_{19}$ | plate-like | 3 | 21.3 | 2100 | 1 | 1.1 | 5.6 | 80 |
| Example 4 | 1A | BaFe$_{12}$O$_{19}$ | plate-like | 2.8 | 20.3 | 1950 | 1 | 1.1 | 5.6 | 90 |
| Example 5 | 4A | BaFe$_{12}$O$_{19}$ | plate-like | 2.9 | 20.9 | 2050 | 1 | 1.1 | 5.6 | 80 |
| Example 6 | 7A | ε-Fe$_2$O$_3$ | spherical | 1.3 | 15.7 | 2050 | 1 | 1.1 | 5.6 | 80 |
| Example 7 | 8A | CoO(Fe$_2$O$_3$) | cubic | 1.1 | 12.6 | 2030 | 1 | 1.1 | 5.6 | 80 |
| Example 8 | 5A | BaFe$_{12}$O$_{19}$ | plate-like | 2.3 | 17 | 1400 | 1 | 1.1 | 5.6 | 60 |
| Example 9 | 6A | BaFe$_{12}$O$_{19}$ | plate-like | 2 | 15 | 1100 | 1 | 1.1 | 5.6 | 60 |
| Example 10 | 1A | BaFe$_{12}$O$_{19}$ | plate-like | 2.8 | 20.3 | 1950 | 2 | 1.1 | 5.6 | 80 |
| Example 11 | 2A | BaFe$_{12}$O$_{19}$ | plate-like | 2.6 | 18.6 | 1600 | 3 | 1.1 | 5.2 | 60 |
| Example 12 | 5A | BaFe$_{12}$O$_{19}$ | plate-like | 2.3 | 17 | 1400 | 4 | 1.1 | 5.2 | 60 |

TABLE 2-continued

| | | | | | | | | | | |
|---|---|---|---|---|---|---|---|---|---|---|
| Example 13 | 5A | BaFe$_{12}$O$_{19}$ | plate-like | 2.3 | 17 | 1400 | 5 | 1.0 | 4.5 | 60 |
| Example 14 | 6A | BaFe$_{12}$O$_{19}$ | plate-like | 2 | 15 | 1100 | 6 | 1.0 | 4.5 | 60 |
| Example 15 | 1A | BaFe$_{12}$O$_{19}$ | plate-like | 2.8 | 20.3 | 1950 | 1 | 1.1 | 5.6 | 90 |
| Example 16 | 1A | BaFe$_{12}$O$_{19}$ | plate-like | 2.8 | 20.3 | 1950 | 1 | 1.1 | 5.6 | 80 |
| Example 17 | 7A | ε-Fe$_2$O$_3$ | spherical | 1.3 | 15.7 | 2050 | 1 | 1.1 | 5.6 | 90 |
| Example 18 | 1A | BaFe$_{12}$O$_{19}$ | plate-like | 2.8 | 20.3 | 1950 | 1 | 1.1 | 5.6 | 80 |
| Example 19 | 1A | BaFe$_{12}$O$_{19}$ | plate-like | 2.8 | 20.3 | 1950 | 1 | 1.1 | 5.6 | 80 |
| Comparative Example 1 | 2B | BaFe$_{12}$O$_{19}$ | plate-like | 3.5 | 23.6 | 2450 | 1 | 1.1 | 5.6 | 85 |
| Comparative Example 2 | 1A | BaFe$_{12}$O$_{19}$ | plate-like | 2.8 | 20.3 | 1950 | 1 | 1.1 | 5.6 | 100 |
| Comparative Example 3 | 1A | BaFe$_{12}$O$_{19}$ | plate-like | 2.8 | 20.3 | 1950 | 1 | 1.1 | 5.6 | 85 |
| Comparative Example 4 | 9A | BaFe$_{12}$O$_{19}$ | plate-like | 3.0 | 21.3 | 2090 | 1 | 1.1 | 5.6 | 80 |
| Comparative Example 5 | 7A | ε-Fe$_2$O$_3$ | spherical | 1.3 | 15.7 | 2050 | 1 | 1.1 | 5.6 | 80 |
| Comparative Example 6 | 8A | CoO(Fe$_2$O$_3$) | cubic | 1.1 | 12.6 | 2030 | 1 | 1.1 | 5.6 | 80 |
| Comparative Example 7 | 1A | BaFe$_{12}$O$_{19}$ | plate-like | 2.8 | 20.3 | 1950 | 1 | 1.1 | 5.6 | 80 |
| Comparative Example 8 | 1A | BaFe$_{12}$O$_{19}$ | plate-like | 2.8 | 20.3 | 1950 | 1 | 1.1 | 5.6 | 80 |
| Comparative Example 9 | 1A | BaFe$_{12}$O$_{19}$ | plate-like | 2.8 | 20.3 | 1950 | 1 | 1.1 | 5.6 | 80 |

| | Tape | | | | Friction Coefficient | Magnetic Layer | Magnetic Layer ≤ | Result of Evaluation | |
|---|---|---|---|---|---|---|---|---|---|
| | Hc1 [Oe] | Hc2 [Oe] | Hc2/Hc1 | BET$_{tape}$ [m$^2$/g] | Ratio $\mu C_{(1000)}/\mu C_{(5)}$ | Ra [nm] | PSD$_{(5\,um)}$ [um] | C/N [dB] | Traveling Stability |
| Example 1 | 2750 | 2000 | 0.73 | 3.5 | 1.2 | 1.9 | 2.1 | 2.0 | Allowable |
| Example 2 | 2920 | 1920 | 0.66 | 3.3 | 1.3 | 1.85 | 2 | 3.8 | Allowable |
| Example 3 | 2750 | 2000 | 0.73 | 3.6 | 1.2 | 1.9 | 2.1 | 1.7 | Allowable |
| Example 4 | 2750 | 2000 | 0.73 | 3.5 | 1.3 | 1.9 | 2.1 | 1.6 | Allowable |
| Example 5 | 2980 | 2000 | 0.67 | 3.5 | 1.2 | 1.9 | 2.1 | 2.6 | Allowable |
| Example 6 | 2850 | 2020 | 0.71 | 3.6 | 1.3 | 2 | 2.1 | 2.1 | Allowable |
| Example 7 | 2800 | 2020 | 0.72 | 3.6 | 1.3 | 2 | 2.1 | 1.9 | Allowable |
| Example 8 | 2550 | 1820 | 0.71 | 3.2 | 1.3 | 1.8 | 1.9 | 3 | Allowable |
| Example 9 | 2500 | 1840 | 0.74 | 3.1 | 1.4 | 1.75 | 1.8 | 3.3 | Allowable |
| Example 10 | 2750 | 2000 | 0.73 | 3.5 | 1.2 | 1.9 | 2.1 | 1.6 | Allowable |
| Example 11 | 2920 | 1920 | 0.66 | 3.3 | 1.3 | 1.85 | 2 | 3.3 | Allowable |
| Example 12 | 2550 | 1820 | 0.71 | 3.3 | 1.3 | 1.8 | 1.9 | 2.5 | Allowable |
| Example 13 | 2550 | 1820 | 0.71 | 3.3 | 1.3 | 1.8 | 1.9 | 2 | Allowable |
| Example 14 | 2500 | 1840 | 0.74 | 3 | 1.4 | 1.75 | 1.8 | 2.3 | Allowable |
| Example 15 | 2990 | 1500 | 0.5 | 3.5 | 1.2 | 1.85 | 2 | 3 | Allowable |
| Example 16 | 2690 | 2150 | 0.8 | 3.5 | 1.2 | 1.85 | 2 | 1.3 | Allowable |
| Example 17 | 2900 | 1950 | 0.67 | 3.3 | 1.3 | 2 | 2.1 | 2.5 | Allowable |
| Example 18 | 2750 | 2000 | 0.73 | 2.5 | 1.8 | 1.6 | 1.7 | 3 | Allowable |
| Example 19 | 2750 | 2000 | 0.73 | 4.2 | 1.1 | 2.4 | 2.5 | 1.2 | Allowable |
| Comparative Example 1 | 2820 | 2000 | 0.71 | 3.7 | 1.1 | 1.9 | 2.1 | 0 | Allowable |
| Comparative Example 2 | 2750 | 2000 | 0.73 | 3.5 | 1.2 | 1.9 | 2.1 | 1 | Allowable |
| Comparative Example 3 | 2500 | 2100 | 0.84 | 3.5 | 1.2 | 1.9 | 2.1 | 0.3 | Allowable |
| Comparative Example 4 | 3100 | 2000 | 0.65 | 3.5 | 1.2 | 1.9 | 2.1 | 0.9 | Allowable |
| Comparative Example 5 | 2550 | 2080 | 0.82 | 3.5 | 1.2 | 1.9 | 2.1 | 0.7 | Allowable |
| Comparative Example 6 | 2450 | 2080 | 0.85 | 3.5 | 1.2 | 1.9 | 2.1 | 0.6 | Allowable |
| Comparative Example 7 | 2750 | 2000 | 0.73 | 3.7 | 1.1 | 2.55 | 3.2 | 0.2 | Allowable |
| Comparative Example 8 | 2750 | 2000 | 0.73 | 3.4 | 2.4 | 1.6 | 1.7 | 2.6 | Not Allowable |
| Comparative Example 9 | 2750 | 2000 | 0.73 | 2.4 | 2.4 | 1.3 | 1.4 | 3.2 | Not Allowable |

Table 2 shows the magnetic properties and the evaluation results of the magnetic recording media of Examples 1 to 19 and Comparative Examples 1 to 9.

TABLE 3

| | Tape Configuration | Average Thickness of Magnetic Tape [μm] | Number of Servo Tracks | Average Thickness of Base Film [μm] | W/L | W [μm] | L [μm] |
|---|---|---|---|---|---|---|---|
| Media Configuration 1 | magnetic layer/underlayer/base film/back layer | 5.6 | 5 | 4.0 | 50 | 2.9 | 0.052 |
| Media Configuration 2 | magnetic layer/underlayer/base film/back layer | 5.6 | 5 | 4.0 | 30 | 1.5 | 0.048 |
| Media Configuration 3 | magnetic layer/underlayer/base film/back layer | 5.2 | 5 | 3.6 | 23 | 0.95 | 0.042 |
| Media Configuration 4 | magnetic layer/underlayer/base film/back layer | 5.2 | 9 | 3.6 | 13 | 0.51 | 0.039 |
| Media Configuration 5 | magnetic layer/underlayer/base film/back layer | 4.5 | 9 | 3.1 | 21 | 0.83 | 0.039 |
| Media Configuration 6 | magnetic layer/underlayer/base film/back layer | 4.5 | 9 | 3.1 | 16 | 0.63 | 0.038 |

Table 3 shows the media configurations employed in Examples 1 to 19 and Comparative Examples 1 to 9.

As shown in Tables 2 and 3, in Examples 1 to 19, the average thickness of the magnetic layer is 90 nm or less, the average aspect ratio of the magnetic powders is 1.0 or greater and 3.0 or less, the coercivity Hc1 in the perpendicular direction is 3000 Oe or less, Hc2/Hc1 is 0.8 or less, and the entire BET specific surface area of the magnetic recording medium from which the lubricant has been removed is 2.5 m²/g or greater. Therefore, it is possible to secure favorable electromagnetic conversion characteristics (C/N) while maintaining favorable traveling stability of the magnetic recording medium. Accordingly, it is possible to achieve a configuration advantageous for high-density recording.

In particular, in Examples 1 to 17 and 19, the BET-specific surface area of the entire magnetic recording medium from which the lubricant has been removed was 3.0 m²/g or greater, and thus the friction coefficient ratio (μB/μA) was 1.4 or less. Accordingly, the change in the dynamic friction coefficient due to a variation in tension at the time of traveling became smaller, and the travel of the magnetic recording medium was made more stable, compared with the case where the BET specific surface area is less than 3.0 m²/g.

In particular, in Examples 1, 3 to 7, 10, 15, 16, and 19, the BET-specific surface area of the entire magnetic recording medium from which the lubricant has been removed was 3.5 m²/g or greater, and thus the friction coefficient ratio (μB/μA) was 1.3 or less. Accordingly, the change in the dynamic friction coefficient due to a variation of tension at the time of traveling became much smaller, and the travel of the magnetic recording medium was made much more stable, compared with the case where the BET specific surface area is less than 3.5 m²/g. Specifically, in Example 19, the BET-specific surface area of the entire magnetic recording medium from which the lubricant has been removed was 4.2 m²/g, and thus the friction coefficient ratio (μB/μA) was 1.1 or less. Accordingly, the travel of the magnetic recording medium was made much more stable.

Further, in Examples 1 to 19, since the friction coefficient ratio (μC(1000)/μC(5)) was 1.0 or greater and 1.8 or less, the change in the dynamic friction coefficient due to the multiple-time traveling became smaller, and the magnetic recording medium was made stable.

Further, in Examples 1 to 19, since the average particle size of the magnetic powders is 8 nm or greater and 22 nm or less, it was possible to secure favorable electromagnetic conversion characteristics (C/N).

Further, in Examples 1 to 19, since the arithmetic mean roughness Ra of the surface of the magnetic layer was 2.5 nm or less, it was possible to obtain excellent electromagnetic conversion characteristics. In Examples 1 to 19, since the PSD up to the spatial wavelength of 5 μm was 2.5 μm or less, a spacing between the recording and reproducing head for recording and reproducing and the tape-like magnetic recording medium became smaller, making the magnetic recording medium suitable for high recording density.

In Comparative Example 1, since the average aspect ratio of the magnetic powders was greater than 3.0, stacking of the magnetic tape was generated, and the electromagnetic conversion characteristics was deteriorated.

In Comparative Example 2, since the average thickness of the magnetic layer was large, the electromagnetic conversion characteristics at short wavelengths were deteriorated.

In Comparative Example 3, the degree of perpendicular orientation was low, and the electromagnetic conversion characteristics were deteriorated.

In Comparative Example 4, since the coercivity Hc1 in the perpendicular direction was too large, unsaturated regions were generated, and the electromagnetic transduction characteristics were deteriorated.

In Comparative Examples 5 and 6, the degree of perpendicular orientation was low, and the electromagnetic conversion characteristics were deteriorated.

In Comparative Example 7, the electromagnetic conversion characteristics were deteriorated due to the deterioration of the surface property of the magnetic layer.

In Comparative Example 8, the electromagnetic conversion characteristics were improved, but travel of the magnetic recording medium was made impossible due to an increase in the friction of the surface of the magnetic layer.

In Comparative Example 9, the electromagnetic conversion characteristics were improved, but travel of the magnetic recording medium was made impossible due to an increase in the friction of the surface of the magnetic layer.

While the present disclosure has been described in specific with reference to the embodiments and modification examples thereof, the present disclosure is not limited to the above embodiments and the like, and various modifications are able to be made.

For example, the configurations, methods, processes, shapes, materials, and numerical values, and the like described in the above embodiments and modification examples thereof are merely examples, and different configurations, methods, processes, shapes, materials, numerical values, and the like may be used, as necessary. Specifically, the magnetic recording medium of the present disclosure may include components other than the base, the underlayer, the magnetic layer, the back layer and the barrier layer. In addition, the chemical formulae of the compounds or the like are representative examples, and are not limited to the valences and the like described above as long as the compounds with the same general names are employed.

Further, the configurations, methods, processes, shapes, materials, numerical values, and the like of the above-described embodiments and modification examples thereof may be combined with each other without departing from the spirit of the present disclosure.

Further, in the numerical value ranges described in stages herein, the upper limit value or the lower limit value of the numerical value range in any stage may be replaced with the upper limit value or the lower limit value of the numerical value range in another stage. Unless otherwise specified, the materials exemplified herein may be used alone, or two or more thereof may be used in combination.

As described above, according to the magnetic recording medium of one embodiment of the present disclosure, it is possible to achieve higher density recording.

It is to be noted that the effect of the present disclosure is not limited thereto, and may be any effects described herein. Further, the present technology may have the following configurations.

(1) A magnetic recording medium having a tape-like shape, the magnetic recording medium including:
a base containing polyester as a main constituent; and
a magnetic layer provided on the base, including a plurality of magnetic powders, and configured to record a data signal, in which
an average thickness of the magnetic recording medium is 5.6 µm or less,
an average thickness of the base is 4.2 µm or less,
an average thickness of the magnetic layer is 90 nm or less,
an average aspect ratio of the magnetic powders is 1.0 or greater and 3.0 or less,
a coercivity in a perpendicular direction is 3000 oersted or less,
a rate of a coercivity in a longitudinal direction to a coercivity in a perpendicular direction is 0.8 or less,
the magnetic layer includes a lubricant, and
an entire BET specific surface area of the magnetic recording medium from which the lubricant has been removed is 2.5 m$^2$/g or greater.

(2) The magnetic recording medium according to (1) described above, in which the entire BET specific surface area of the magnetic recording medium from which the lubricant has been removed is 3.0 m$^2$/g or greater.

(3) The magnetic recording medium according to (1) described above, in which the entire BET specific surface area of the magnetic recording medium from which the lubricant has been removed is 3.5 m$^2$/g or greater.

(4) The magnetic recording medium according to (1) described above, in which the entire BET specific surface area of the magnetic recording medium from which the lubricant has been removed has been 4.0 m$^2$/g or greater.

(5) The magnetic recording medium according to any one of (1) to (4) described above, in which
a friction coefficient ratio µC(1000)/µC(5) between a dynamic friction coefficient µC(5) and a dynamic friction coefficient µC(1000) is 1.0 or greater and 1.8 or less, the dynamic friction coefficient µC(5) being a dynamic friction coefficient between a surface of the magnetic recording medium and a magnetic head in a fifth travel from a start of travel of the magnetic recording medium in a case where a tension of 0.6 N is applied to the magnetic recording medium, the dynamic friction coefficient µC(1000) being a dynamic friction coefficient between the surface and the magnetic head in a 1000th travel from the start of travel of the magnetic recording medium in a case where a tension of 0.6 N is applied to the magnetic recording medium.

(6) The magnetic recording medium according to any one of (1) to (6) described above, in which an average particle diameter of the plurality of magnetic powders is 8 nm or greater and 22 nm or less.

(7) The magnetic recording medium according to any one of (1) to (6) described above, in which an average particle volume of the plurality of magnetic powders is 2300 nm$^3$ or less.

(8) The magnetic recording medium according to any one of (1) to (7) described above, in which
an arithmetic mean roughness Ra of a surface of the magnetic layer is 2.5 nm or less, and
a PSD (power spectrum density) up to a spatial wavelength of 5 µm is 2.5 µm or less.

(9) The magnetic recording medium according to any one of (1) to (8) described above, in which the coercivity in the longitudinal direction is 2000 Oe or less.

(10) The magnetic recording medium according to any one of (1) to (9) described above, in which the average thickness of the magnetic recording medium is 5.6 µm or less.

(11) The magnetic recording medium according to any one of (1) to (10) described above, in which the average thickness of the base is 4.2 µm or less.

(12) The magnetic recording medium according to any one of (1) to (11) described above, in which the magnetic powders include hexagonal ferrite containing at least one of Ba (barium) or Sr (strontium); s-iron oxide containing at least one of Al (aluminum) or Ga (gallium); or spinel ferrite containing Co (cobalt).

(13) The magnetic recording medium according to any one of (1) to (12) described above, in which the average thickness of the magnetic layer is 80 nm or less.

(14) The magnetic recording medium according to any one of (1) to (13) described above, in which the average thickness of the magnetic layer is 60 nm or less.

(15) The magnetic recording medium according to any one of (1) to (14) described above, the magnetic recording medium satisfying the following conditional expression (1):

$$Hc2/Hc1 \leq 0.7 \qquad (1)$$

where Hc1 represents the coercivity in the perpendicular direction, and Hc2 represents the coercivity in the longitudinal direction.

(16) The magnetic recording medium according to any one of (1) to (15) described above, in which the coercivity in the perpendicular direction is 2200 Oe or greater.

(17) The magnetic recording medium according to any one of (1) to (16) describe above, in which
the magnetic layer includes a plurality of servo bands each of which is configured to record a plurality of servo signals, and a ratio of total area of the plurality of servo bands to area of a surface of the magnetic layer is 4.0% or less.

(18) The magnetic recording medium according to (17) described above, in which number of the plurality of servo bands is 5 or greater.

(19) The magnetic recording medium according to (17) or (18) described above, in which the servo bands each have a width of 95 nm.

(20) The magnetic recording medium according to any one of (1) to (19) described above, in which
the magnetic layer is configured to form a plurality of recording tracks, and
the recording tracks each have a width of 3.0 µm or less.

(21) The magnetic recording medium according to any one of (1) to (20) described above, in which the magnetic layer is configured to record data to set a minimum value of a distance between magnetization reversals to 48 nm or less.

(22) A magnetic recording and reproducing apparatus including:
a feeding section configured to sequentially feed a magnetic recording medium having a tape-like shape;
a reel section configured to reel in the magnetic recording medium fed from the feeding section; and
a magnetic head configured to write data in the magnetic recording medium and retrieve the data from the magnetic recording medium while being in contact with the magnetic recording medium traveling from the feeding section to the reel section, in which
the magnetic recording medium includes
a base including polyester as a main constituent, and
a magnetic layer provided on the base, including a plurality of magnetic powders, and configured to record a data signal,
an average thickness of the magnetic recording medium is 5.6 µm or less,
an average thickness of the base is 4.2 µm or less,
an average thickness of the magnetic layer is 90 nm or less,
an average aspect ratio of the magnetic powders is 1.0 or greater and 3.0 or less,
a coercivity in a perpendicular direction is 3000 oersted or less,
a rate of a coercivity in a longitudinal direction to the coercivity in the perpendicular direction is 0.8 or less,
the magnetic layer includes a lubricant, and
an entire BET specific area of the magnetic recording medium from which the lubricant has been removed is 2.5 m$^2$/g or greater.

(23) A magnetic recording medium cartridge including:
a magnetic recording medium having a tape-like shape; and
a housing accommodating the magnetic recording medium, in which
the magnetic recording medium includes
a base including polyester as a main constituent,
a magnetic layer provided on the base, including a plurality of magnetic powders, and configured to record a data signal,
an average thickness of the magnetic recording medium is 5.6 µm or less.
an average thickness of the base is 4.2 µm or less,
an average thickness of the magnetic layer is 90 nm or less,
an average aspect ratio of the magnetic powders is 1.0 or greater and 3.0 or less,
a coercivity in a perpendicular direction is 3000 oersted or less.

a rate of a coercivity in a longitudinal direction to a coercivity in a perpendicular direction is 0.8 or less,
the magnetic layer includes a lubricant, and
an entire BET specific surface area of the magnetic recording medium from which the lubricant has been removed is 2.5 m$^2$/g or greater.

The present application claims priority based on Japanese Patent Application No. 2019-176039 filed with the Japan Patent Office on Sep. 26, 2019, the entire contents of which are incorporated herein by reference.

It should be understood that those skilled in the art would make various modifications, combinations, sub-combinations, and alterations depending on design requirements and other factors, and they are within the scope of the attached claims or the equivalents thereof.

The invention claimed is:

1. A magnetic recording medium having a tape shape, the magnetic recording medium comprising:
a base containing polyester as a main constituent; and
a magnetic layer provided on the base, including a plurality of magnetic powders, and configured to record a data signal, wherein
an average thickness of the magnetic recording medium is 5.6 µm or less,
an average thickness of the base is 4.2 µm or less,
an average thickness of the magnetic layer is 90 nm or less,
an average aspect ratio of the magnetic powders is 1.0 or greater and 3.0 or less,
a coercivity in a perpendicular direction is 3000 oersted or less,
a rate of a coercivity in a longitudinal direction to a coercivity in a perpendicular direction is 0.8 or less,
the magnetic layer includes a lubricant, and
an entire BET specific surface area of the magnetic recording medium from which the lubricant has been removed is 2.5 m$^2$/g or greater.

2. The magnetic recording medium according to claim 1, wherein the entire BET specific surface area of the magnetic recording medium from which the lubricant has been removed is 3.0 m$^2$/g or greater.

3. The magnetic recording medium according to claim 1, wherein the entire BET specific surface area of the magnetic recording medium from which the lubricant has been removed is 3.5 m$^2$/g or greater.

4. The magnetic recording medium according to claim 1, wherein the entire BET specific surface area of the magnetic recording medium from which the lubricant has been removed is 4.0 m$^2$/g or greater.

5. The magnetic recording medium according to claim 1, wherein
a friction coefficient ratio µC(1000)/µC(5) between a dynamic friction coefficient µC(5) and a dynamic friction coefficient µC(1000) is 1.0 or greater and 1.8 or less, the dynamic friction coefficient µC(5) being a dynamic friction coefficient between a surface of the magnetic recording medium and a magnetic head in a fifth travel from a start of travel of the magnetic recording medium in a case where a tension of 0.6 N is applied to the magnetic recording medium, the dynamic friction coefficient µC(1000) being a dynamic friction coefficient between the surface and the magnetic head in a 1000th travel from the start of travel of the magnetic recording medium in a case where a tension of 0.6 N is applied to the magnetic recording medium.

6. The magnetic recording medium according to claim 1, wherein an average particle diameter of the plurality of magnetic powders is 8 nm or greater and 22 nm or less.

7. The magnetic recording medium according to claim 1, wherein an average particle volume of the plurality of magnetic powders is 2300 nm$^3$ or less.

8. The magnetic recording medium according to claim 1, wherein
an arithmetic mean roughness Ra of a surface of the magnetic layer is 2.5 nm or less, and
a PSD (power spectrum density) up to a spatial wavelength of 5 µm is 2.5 µm or less.

9. The magnetic recording medium according to claim 1, wherein the coercivity in the longitudinal direction is 2000 Oe or less.

10. The magnetic recording medium according to claim 1, wherein the magnetic powders include hexagonal ferrite containing at least one of Ba (barium) or Sr (strontium); ε-iron oxide containing at least one of Al (aluminum) or Ga (gallium); or spinel ferrite containing Co (cobalt).

11. The magnetic recording medium according to claim 1, wherein the average thickness of the magnetic layer is 80 nm or less.

12. The magnetic recording medium according to claim 1, wherein the average thickness of the magnetic layer is 60 nm or less.

13. The magnetic recording medium according to claim 1, satisfying the following conditional expression (1):

$$Hc2/Hc1 \leq 0.7 \quad (1)$$

where Hc1 represents the coercivity in the perpendicular direction, and Hc2 represents the coercivity in the longitudinal direction.

14. The magnetic recording medium according to claim 1, wherein the coercivity in the perpendicular direction is 2200 Oe or greater.

15. The magnetic recording medium according to claim 1, wherein
the magnetic layer includes a plurality of servo bands each of which is configured to record a plurality of servo signals, and
a ratio of total area of the plurality of servo bands to area of a surface of the magnetic layer is 4.0% or less.

16. The magnetic recording medium according to claim 15, wherein number of the plurality of servo bands is 5 or greater.

17. The magnetic recording medium according to claim 15, wherein the servo bands each have a width of 95 nm.

18. The magnetic recording medium according to claim 1, wherein
the magnetic layer is configured to form a plurality of recording tracks, and
the recording tracks each have a width of 3.0 µm or less.

19. The magnetic recording medium according to claim 1, wherein the magnetic layer is configured to record data to set a minimum value of a distance between magnetization reversals to 48 nm or less.

20. A magnetic recording and reproducing apparatus comprising:
a feeding section configured to sequentially feed a magnetic recording medium having a tape shape;
a reel section configured to reel in the magnetic recording medium fed from the feeding section; and
a magnetic head configured to write data in the magnetic recording medium and retrieve the data from the magnetic recording medium while being in contact with the magnetic recording medium traveling from the feeding section to the reel section, wherein
the magnetic recording medium includes
a base including polyester as a main constituent, and
a magnetic layer provided on the base, including a plurality of magnetic powders, and configured to record a data signal,
an average thickness of the magnetic recording medium is 5.6 µm or less,
an average thickness of the base is 4.2 µm or less,
an average thickness of the magnetic layer is 90 nm or less,
an average aspect ratio of the magnetic powders is 1.0 or greater and 3.0 or less,
a coercivity in a perpendicular direction is 3000 oersted or less,
a rate of a coercivity in a longitudinal direction to a coercivity in a perpendicular direction is 0.8 or less,
the magnetic layer includes a lubricant, and
an entire BET specific area of the magnetic recording medium from which the lubricant has been removed is 2.5 m$^2$/g or greater.

21. A magnetic recording medium cartridge comprising:
a magnetic recording medium having a tape shape; and
a housing accommodating the magnetic recording medium, wherein
the magnetic recording medium includes
a base including polyester as a main constituent,
a magnetic layer provided on the base, including a plurality of magnetic powders, and configured to record a data signal,
an average thickness of the magnetic recording medium is 5.6 µm or less,
an average thickness of the base is 4.2 µm or less,
an average thickness of the magnetic layer is 90 nm or less,
an average aspect ratio of the magnetic powders is 1.0 or greater and 3.0 or less,
a coercivity in a perpendicular direction is 3000 oersted or less,
a rate of a coercivity in a longitudinal direction to a coercivity in a perpendicular direction is 0.8 or less,
the magnetic layer includes a lubricant, and
an entire BET specific surface area of the magnetic recording medium from which the lubricant has been removed is 2.5 m$^2$/g or greater.

* * * * *